United States Patent [19]

Man-Hak Tso

[11] Patent Number: 5,706,509

[45] Date of Patent: Jan. 6, 1998

[54] APPLICATION INDEPENDENT RECORD LEVEL SYNCHRONIZATION

[75] Inventor: Michael Man-Hak Tso, Beaverton, Oreg.

[73] Assignee: Intel Corporation, Santa Clara, Calif.

[21] Appl. No.: 431,500

[22] Filed: Apr. 28, 1995

[51] Int. Cl.⁶ .................................................. G06F 17/30
[52] U.S. Cl. ........................ 395/617; 395/616; 395/618
[58] Field of Search ................................. 395/600, 161, 395/200, 617

[56] References Cited

U.S. PATENT DOCUMENTS

| | | | |
|---|---|---|---|
| 4,408,273 | 10/1983 | Plow | 364/200 |
| 4,410,942 | 10/1983 | Milligan et al. | 364/200 |
| 4,853,843 | 8/1989 | Ecklund | 364/200 |
| 4,875,159 | 10/1989 | Cary et al. | 364/200 |
| 5,355,477 | 10/1994 | Strickland et al. | 395/600 |
| 5,392,390 | 2/1995 | Crozier | 395/161 |
| 5,485,607 | 1/1996 | Lomet et al. | 395/600 |
| 5,526,518 | 6/1996 | Kashio | 395/600 |
| 5,544,345 | 8/1996 | Carpenter et al. | 395/477 |

*Primary Examiner*—Thomas G. Black
*Assistant Examiner*—Jean M. Corrièlus
*Attorney, Agent, or Firm*—Blakely, Sokoloff, Taylor & Zafman

[57] ABSTRACT

A method and an apparatus for synchronization of a first set of data with a second set of data at the record level. A memory stores a change detection mechanism for generating a Change List for the first and second sets of data. The Change List lists the changes made at the record level to the first and second sets of data. The memory also has a Synchronization mechanism for making the first set of data and the second set of data equivalent by using the information in the Change List generated by the Change Detection Mechanism. A processor runs the Change Detection mechanism and the Synchronization mechanism.

15 Claims, 28 Drawing Sheets

Figure 1
*(Prior Art)*

| At T0 | At T1 | At T2 (AFTER FILE SYNC.) | |
|---|---|---|---|
| D0 = [A, B, C, D] | D0' = [E, B, C, D] | D0'' = [E, B, C, D] | D0'' = [A, B, C, F] |
| D1 = [A, B, C, D] | D1' = [A, B, C, F] | D1'' = [E, B, C, D] OR | D1'' = [A, B, C, F] |

Figure 2

| At T0 | At T1 | At T2 (AFTER RECORD SYNC.) |
|---|---|---|
| D0 = [A, B, C, D] | D0' = [E, B, C, D] | D0'' = [E, B, C, F] |
| D1 = [A, B, C, D] | D1' = [A, B, C, F] | D1'' = [E, B, C, F] |

| Rm | Updated | Rm' | |
|----|---------|-----|---|
| Rp | Deleted | | |
| Rt | Updated | Rt' | |
| | Created | Ru | |

330　　　321　　322　　323

CL0

| Rx | Updated | Rx' | |
|----|---------|-----|---|
| Rz | Deleted | | |
| | Created | Ry | |
| | | | |

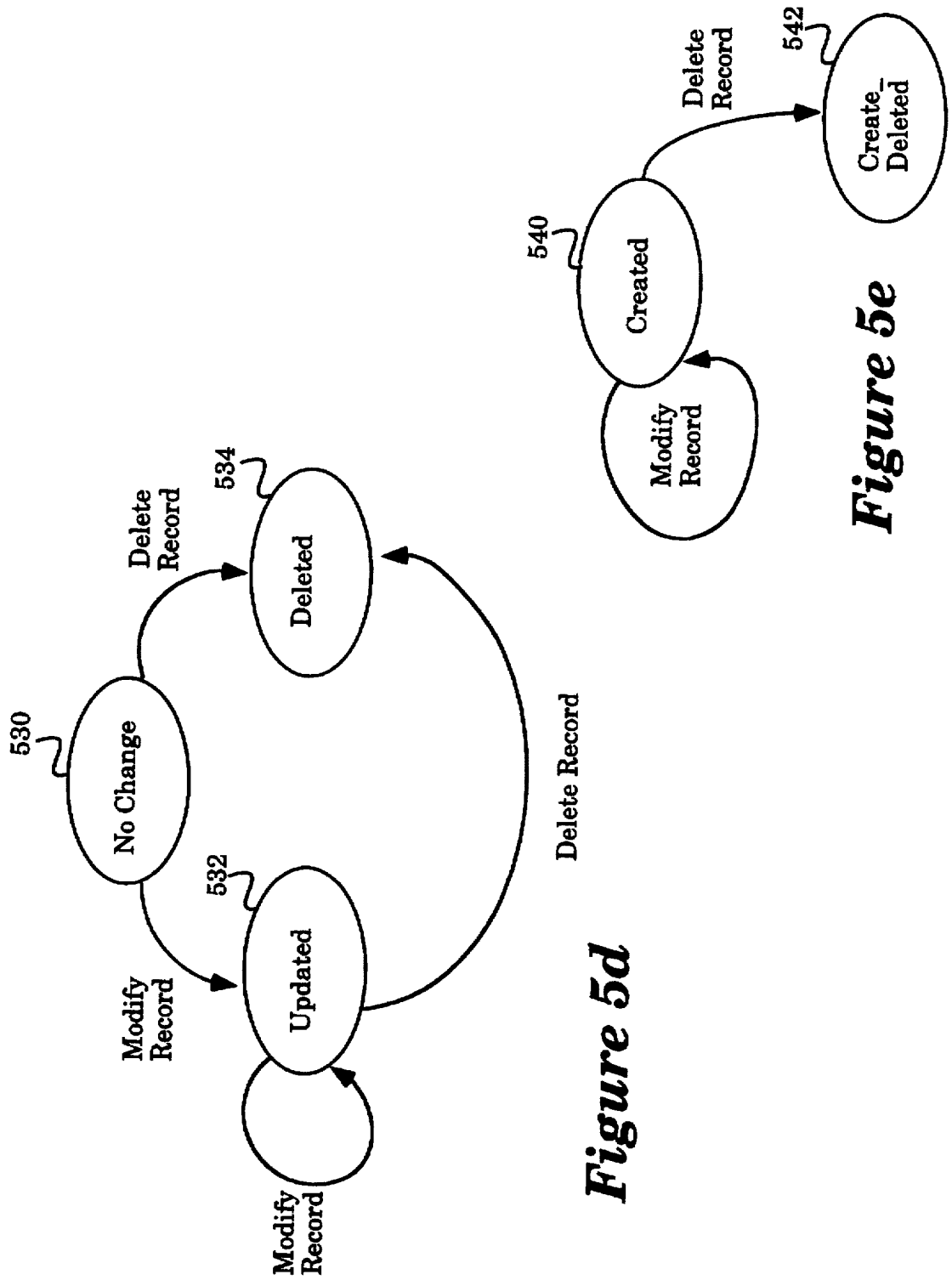

| Case # | D0 Change | D1 Change | D0 Result | D1 Result |
|---|---|---|---|---|
| 1 | Create R1 | No Change | R1+ | R1+ |
| 2 | Modify R1-->R1' | No Change | R1-->R1' | R1-->R1' |
| 3 | Delete R1 | No Change | R1- | R1- |
| 4 | Modify Key R1-->R1' | No Change | R1-->R1' | R1-, R1'+ |
| 5 | No Change | Create R1 | R1+ | R1+ |
| 6 | No Change | Modify R1-->R1' | R1-->R1' | R1-->R1' |
| 7 | No Change | Delete R1 | R1- | R1- |
| 8 | No Change | Modify Key R1-->R1' | R1-->R1' | R1+ |
| 9 | Create R1 | Create R1' | R1+, R1'+ | R1+, R1'+ |
| 10 | Create R1 | Modify R1-->R1' | R1-->R1' | R1-->R1' |
| 11 | Modify R1-->R1' | Modify R1-->R1'' | R1-->R1' | R1-->R1'', R1'+ |
| 12 | Modify R1-->R1' | Delete R1 | R1-, R2+ | R1-, R2+ |
| 13 | Modify R1-->R1' | Modify Key R1-->R1' | R1-->R1' | R1-, R2+ |
| 14 | Modify Key R1-->R2 | Create R2 | R1-, R2+ | R1-->R1' |
| 15 | Modify Key R1-->R2 | Modify R1-->R1' | R1-, R2+, R1'+ | R1-->R1', R2+ |
| 16 | Modify Key R1-->R2 | Modify Key R1-->R3 | R1-, R2+ | R1-->R2 |
| 17 | Modify Key R1-->R2 | Modify Key R1-->R1' | R1-, R2+, R3+ | R1-->R3, R2+ |
| 18 | Modify Key R1-->R2 | Delete R1 | R1-, R2+ | R1-->R1', R2+ |
| 19 | Delete R1 | Modify R1-->R1' | R1-, R2+ | R1-->R1' |
| 20 | Delete R1 | Delete R1 | R1- | R1- |

| Case # | D0 Change | D1 Change | D0 Result | D1 Result |
|---|---|---|---|---|
| 21 | Create RR1 | No Change | RR1+ | RR1+ |
| 22 | Modify RR1–>RR1' | No Change | RR1–>RR1' | RR1–>RR1' |
| 23 | Delete RR1 | No Change | RR1– | RR1– |
| 24 | Modify Key RR1–>RR1' | No Change | RR1–>RR1' | RR1–, RR1'+ |
| 25 | No Change | Create RR1 | RR1+ | RR1+ |
| 26 | No Change | Modify RR1–>RR1' | RR1+ | RR1–>RR1' |
| 27 | No Change | Delete RR1 | RR1– | RR1– |
| 28 | No Change | Modify Key RR1–>RR1' | RR1–>RR1' | RR1–>RR1' |
| 29 | Create RR1 | Create RR1 | RR1+ | RR1+ |
| 30 | Create RR1 | Create RR1' | RR1+, RR1'+ | RR1+, RR1'+ |
| 31 | Create RR1 | Modify RR2–>RR2' | RR1+, RR2–>RR2' | RR1+, RR2–>RR2' |
| 32 | Create RR1 | Modify RR2–>RR1' | RR1+, RR2– | RR2–>RR1 |
| 33 | Create RR1 | Modify Key RR2–>R3 | RR1+, RR2–>R3 | RR2–>RR1, RR2–>R3 |
| 34 | *Create RR1* | *Delete RR2* | *RR1+, RR2–* | *RR1+, RR2–* |
| 35 | Modify RR1–>RR1' | Modify RR1–>RR1' | RR1–>RR1' | RR1–>RR1' |
| 36 | Modify RR1–>RR1' | Modify RR1–>RR1" | RR1–>RR1', RR1'+ | RR1–>RR1', RR2–>RR2' |
| 37 | Modify RR1–>RR1' | Modify RR2–>RR1' | RR1–>RR1', RR2– | RR2–>RR1 |
| 38 | Modify RR1–>RR1' | Modify RR2–>RR2' | RR1–>RR1', RR2–>RR2' | RR1–>RR1', RR2–>RR2' |
| 39 | Modify RR1–>RR1' | Modify Key RR1–>R3 | RR1–>RR1', R3+ | RR1–>RR3, RR1'+ |
| 40 | Modify RR1–>RR1' | Create RR1' | RR1–>RR1' | RR1'+ |
| 41 | *Modify RR1–>RR1'* | *Create RR2* | *RR1–>RR1', R3+* | *RR1–>RR1', RR2+* |
| 42 | Modify RR1–>RR1' | Delete RR1 | RR1–>RR1' | RR1–>RR1' |
| 43 | *Modify RR1–>RR1'* | *Delete RR2* | *RR1–>RR1', RR2–* | *RR1–>RR1', RR2–* |
| 44 | Modify Key RR2–>R3 | Modify Key RR2–>R4 | RR2–, R3+, R4+ | RR2–>R4, R3+ |
| 45 | Modify Key RR2–>R3 | Modify Key RR2–>R3 | RR2–, R3+ | RR2–>RR2', R3+ |
| 46 | Modify Key RR2–>R3 | Modify RR2–>RR2' | RR2–, R3+ | RR2–, RR1'+ |
| 47 | Modify Key RR2–>R3 | Delete RR2 | RR2–, R3+ | RR1– |
| 48 | Modify Key RR1–>RR1' | Create RR2 | *RR1–, RR2+* | *RR1–, RR2+* |
| 49 | *Delete RR1* | *Create RR2* | *RR1–, RR1'+* | *RR1–, RR1'+* |
| 50 | Delete RR1 | Modify RR1–>RR1' | RR1– | RR1–>RR1' |
| 51 | Delete RR1 | Modify Key RR1–>R3 | RR1– | RR1–>R3 |
| 52 | Delete RR1 | Delete RR1 | RR1– | RR1– |
| 53 | Delete RR1 | Delete RR2 | RR1–, RR2– | RR1–, RR2– |

APPLICATION INDEPENDENT RECORD LEVEL SYNCHRONIZATION

BACKGROUND OF THE INVENTION (1) Field of the Invention

The invention relates to synchronization of data between different applications at the record level (versus a file level), more particularly, to the methods and apparatus for synchronizing data among any applications.

(2) Prior Art

Synchronization is a process by which two or more different sets of data from one or more different applications are made semantically equivalent. Semantically equivalent data sets contain the same information even though they may represent the information differently in digital storage. For example, the time 8:00 am may be encoded by one application as an integer representing the number of minutes since midnight, and another application may encode the same information as a string. For example, the time 8:00 am may be represented as the letter '8' followed by ':', '0', and '0'. Synchronization is only meaningful for use with sets of data with semantic equivalence, i.e. two different representations of essentially the same, or a subset of the same information. For example, it does not make sense to synchronize data in a phone book with data in a to-do list.

The main synchronization technique available today is referred to as file synchronization. There are several PC applications which implement file synchronization. A typical implementation uses time stamps which a computer's file system attaches to each file to determine which files are new or have been modified. The older files are overwritten with the newer files by the same name.

FIG. 1 is a table 10 illustrating two possible results produced by using the prior art technique of file synchronization on two data sets D0 and D1. At time T0, data set D0 has four records A, B, C and D. Data set D1 also has records A, B, C and D. At time T1, data sets D0 and D1 are independently modified. Intermediate data set D0' now has records E, B, C and D, with record A modified to E. Intermediate data set D1' has records A, B, C and F, with record D modified to F. File synchronization overwrites one data set in order to "synchronize" the data sets which have been modified. Thus at Time T2, after a file synchronization, the resulting data sets D0" and D1" have records E, B, C and D if data set D1' is overwritten by the contents of data set D0'. In the alternative, a resulting synchronized data set may have records A, B, C and F, if D0' is overwritten by the contents of D1'. Neither results are completely correct since the first result does not reflect the change of record D to F, and the second result does not reflect the change of record A to E.

File level synchronization's usefulness is severely limited. First of all, since the contents of the one file is replaced or overwritten by the other by its file copy, the two files being synchronized must have the same format. This typically means they must be produced by the same application. Secondly, if both versions of the file have been changed independently of one another, as illustrated in the previous example in FIG. 1, one set of changes will overwrite the other, leading to data loss in synchronization. These limitations of file level synchronization are well understood by those skilled in the art.

Record level synchronization overcomes both of the above mentioned limitations of file level synchronization by synchronizing the individual data items in a file. It uses knowledge of how individual data items are stored in a file. However, record level synchronization is more difficult to implement because file formats are determined by how applications decide to encode their data on digital storage, and varies from one application to another.

Since record level synchronization operates on structured data rather than arbitrary information in a file, it is currently believed by those in the art that record level synchronization requires intimate knowledge of each application's data format, and that the applications involved must have a built in support for synchronization.

State of the art synchronization technology requires each application involved in the process to at least supply the following primitives: a unique identifier by which each data item (record) is uniquely identified and a means by which all changes to its data sets are logged (a change log) and made available to the synchronization mechanism.

Programming interfaces or documentation describing data formats are typically readily available. Therefore, the real barrier in synchronizing data at a record level across applications has not been the lack of knowledge regarding the applications' data formats. Rather, the barrier has been in adding the primitives believed to be necessary for synchronization to existing applications and making these primitives work across different applications.

The difficulties in adding new features to existing applications include costly software rewrites, updating software on end users' systems and coordinating among different application vendors with an interoperability standard so that applications can understand each other's change logs and unique id's. All these are costly exercises, and as a result, there is currently no industry standard for synchronization primitives.

Of the handful of applications which do offer synchronization, most can synchronize only data created by the same application, and a few with data from at most one or two other applications. An example is Arabesque Ecco®, which allows the user to copy his or her database onto a different machine, to make changes to the database independently, and later synchronize that database with his or her master Ecco® database.

Thus it is desirable to have a method and an apparatus for implementing synchronization at a record level which do not require changing existing applications or establishing new application interoperability standards, and for implementing synchronization of data between applications with different data formats.

BRIEF SUMMARY OF THE INVENTION

A method and an apparatus for synchronization of a first set of data with a second set of data at a record level. A memory stores a change detection mechanism for generating a Change List for the first and second sets of data. The Change List lists the changes made at the record level to the first and second sets of data. The memory also has a Synchronization mechanism for making the first set of data and the second set of data equivalent by using the information in the Change List generated by a Change Detection mechanism. A processor runs the Change Detection mechanism and the Synchronization mechanism. The Change List is detected retroactively by comparing the new data with an old copy of the data saved from a previous execution of the Synchronization mechanism. Neither the Change Detection nor the Synchronization mechanisms require unique identifiers to find the record in the new data set which correspond to any given record in the old data set.

BRIEF DESCRIPTION OF THE DRAWINGS

FIG. 1 illustrates synchronization results using a prior art method of file level synchronization.

FIG. 2 illustrates synchronization results using the method and apparatus of the present invention.

FIG. 4c illustrates exemplary data structures for exemplary Change Lists CL0 and CL1.

FIGS. 5d and 5e are state transition diagrams illustrating how a change log is truncated to result in exactly one change flag marked for each record.

FIG. 7c illustrates an exemplary data structure modified by the steps described in FIG. 7a.

FIG. 12 is a table illustrating the Synchronization method of the present invention.

FIG. 13 is a table illustrating exemplary synchronization scenarios where there are records with the same Key Field values.

DETAILED DESCRIPTION OF THE INVENTION

Figure 3A:
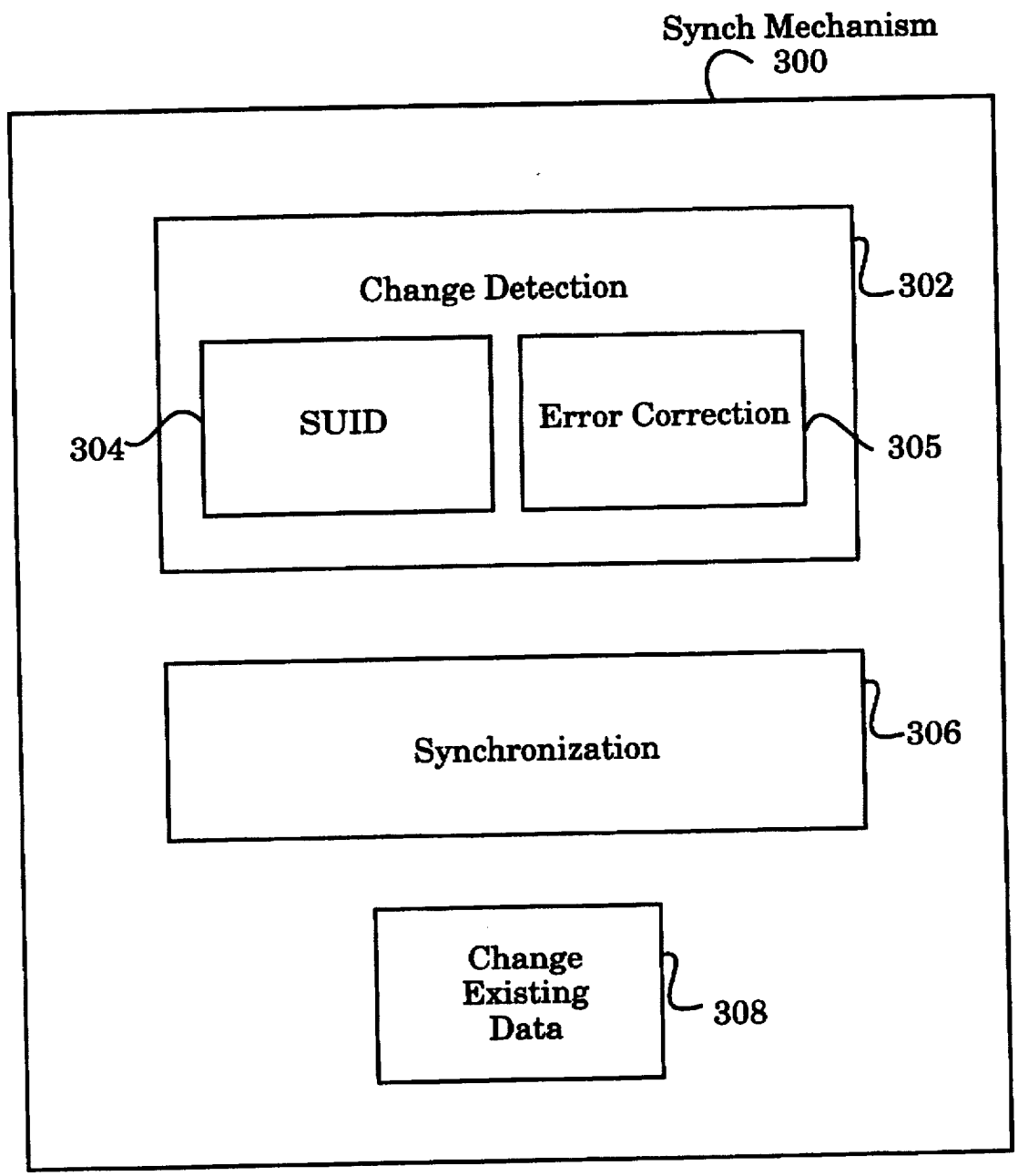
FIG. 3a is a block diagram illustrating the synchronization mechanism of the present invention.

The present invention allows data in an application to be synchronized at a record level (as opposed to a file level) with semantically equivalent data from any set of applications. Synchronization as referred to herein takes as input two different sets of data where those two sets of data become equivalent subsequent to the synchronization process. Equivalent herein refers to records which are semantically the same but which may not be represented the same. For example, a record with information indicating an 8:00 am appointment with Bob stored in two different applications has the same semantics independent of how the data is represented digitally by each of the applications. Given two applications to be synchronized, the method and apparatus of the present invention allows the synchronization process to be performed efficiently and more accurately than prior art methods.

FIG. 2 is a table 20 illustrating the synchronization of two data sets D0 and D1 using record level synchronization of the present invention. At time T0, data set D0 has records A, B, C and D. Data set D1 has records A, B, C and D. At intermediate time T1, data sets D0 and D1 have been independently modified, resulting in intermediate data sets D0' and D1'. Intermediate data set D0' has records E, B, C and D, with record A modified to E. Intermediate data set D1' has records A, B, C and F, with record D modified to F. At time T2 after a record level synchronization, the synchronized data sets D0" and D1" have data items E, B, C and F, reflecting the modification of both record A to E as well as record D to F.

Records A, B, C, etc. referred to above may be records in a database (e.g. a relational database such as for Oracle®, Sybase®, or Microsoft® Access) or structured data records in a file. Examples of structured data records in a file include: phone book records such as those in a Lotus® Organizer or an Arabesque® Ecco file, appointment book records such as those in a Schedule+® or an ACT!® file, and paragraphs, logical text blocks, pictures, tables, or graphs in a Word® document or in an Excel® spreadsheet. The specific products mentioned above are described for illustration purposes only.

Records as referred herein may therefore describe any logically structured data representation on digital media and may be logically distinct data items. On digital storage, records may be intermingled. Although data sets must logically appear as a body of related data (i.e. semantically equivalent) for synchronization purposes, a data set does not have to be in a single file. Thus, data sets may be distributed over a number of files and directories on different physical storage media.

An iterative process of synchronization of two data sets may be illustrated with a simple example. Referring back to the illustration in FIG. 2, given sequential time units T0, T1 and T2 and additional time units T3 and T4 and data sets D0 and D1, if synchronization is performed at the end of time T1, data sets D0 and D1 are equivalent at T2. The synchronized data sets of D0 and D1 are referred to here as D0" and D1" as was done in the illustration of FIG. 2. Data sets D0" and D1" may then be independently modified at T3, either by one or multiple users and/or applications. Upon modification, data sets D0" and D1" become D1'" and D2'". At time T4, synchronization is run with D1'" and D2'" as input, outputting D1"" and D2"". At time T4, D1"" and D2"" are again equivalent data sets.

Although this synchronization process is illustrated with only two data sets to synchronize, namely exemplary data sets D0 and D1, the present invention can easily be extended to synchronize more than two data sets. For more than two data sets, synchronization can be applied to pairs of data sets until all sets are equivalent. For instance, given four data sets D1', D2', D3', and D4', each data set may be synchronized in turn with every other data set. That is, D1' is synchronized in turn with D2', D3', and D4', then D2' is synchronized with D1', D3' and D4', etc. A more efficient implementation would run the Change Detection Method outlined in this invention on each of the data sets, and then merge the Change Lists (CL1, CL2, CL3, CL4). Thus, the present invention's method and apparatus for a two way synchronization also provides synchronization among any number of data sets (i.e. files).

FIG. 3a is a block diagram illustrating the components of an embodiment of the present invention. Sync mechanism 300 has subparts, Change Detection mechanism 302, Semi-Uniquely Identify (SUID) mechanism 304. Error Correction mechanism 305, Change Existing Data mechanism 308 and Synchronization mechanism 306. Change Detection mechanism 302 detects the changes which have occurred to a given data set since the last synchronization. SUID 304 semi-uniquely identifies records based on record content. More specifically, SUID 304 identifies records which do not have system assigned unique identifiers. Error Correction 305 identifies incorrect updates and creates performed by Change Detection mechanism 302. Error conditions triggering Error Correction 305 include when a record's Key Field has changed in D0' and/or when more than one record is sharing the same Key Field values (an example of a non-unique identifier case is described in more detail below). Synchronization mechanism 306, performs the synchronization of data sets, given information regarding the data sets produced by Change Detection mechanism 302. Change Existing Data 308 modifies existing data to make the data sets equivalent.

Figure 3B:
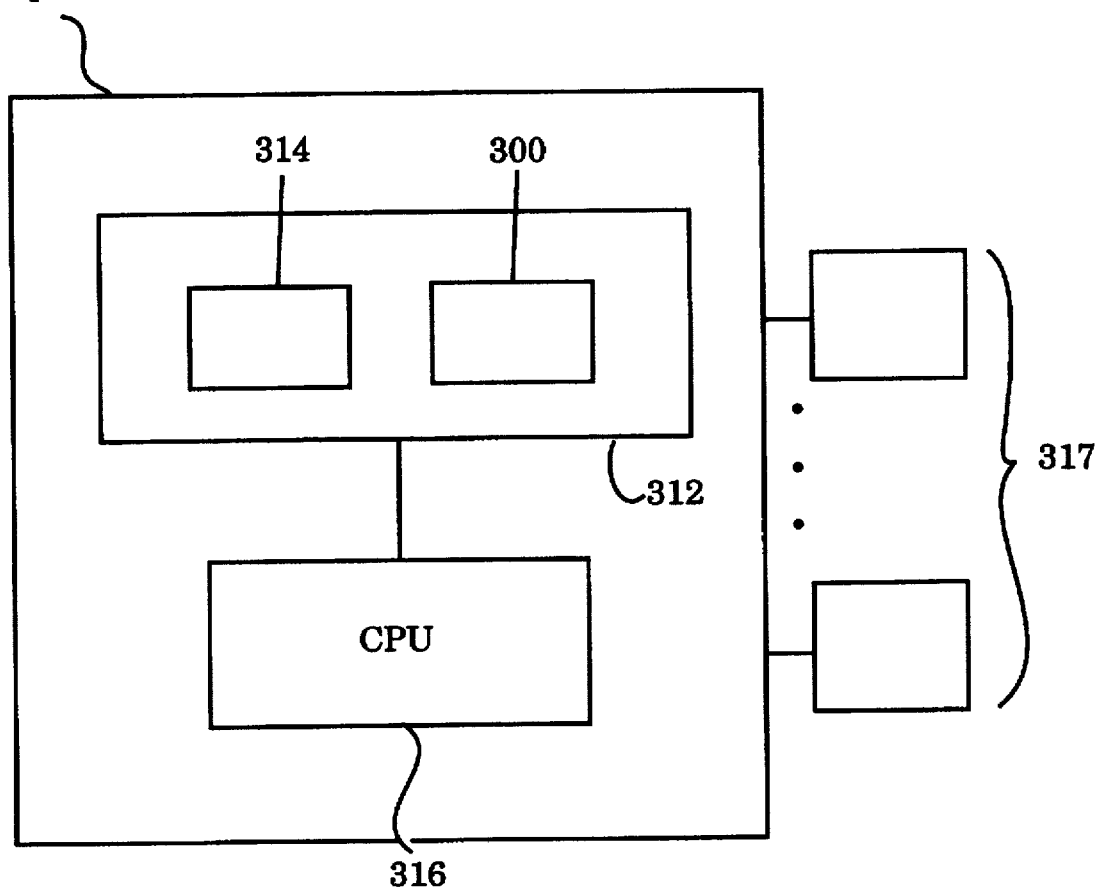
FIG. 3b is an exemplary system block diagram of the present invention.

FIG. 3b illustrates an exemplary system block diagram of the present invention. Computer 310 has memory 312 coupled to CPU 316. Memory 312 has Sync mechanism 300 as well as Change List 314. Further, computer 310 may have various peripheral devices 317 such as a keyboard and/or a display device.

Figure 4A:
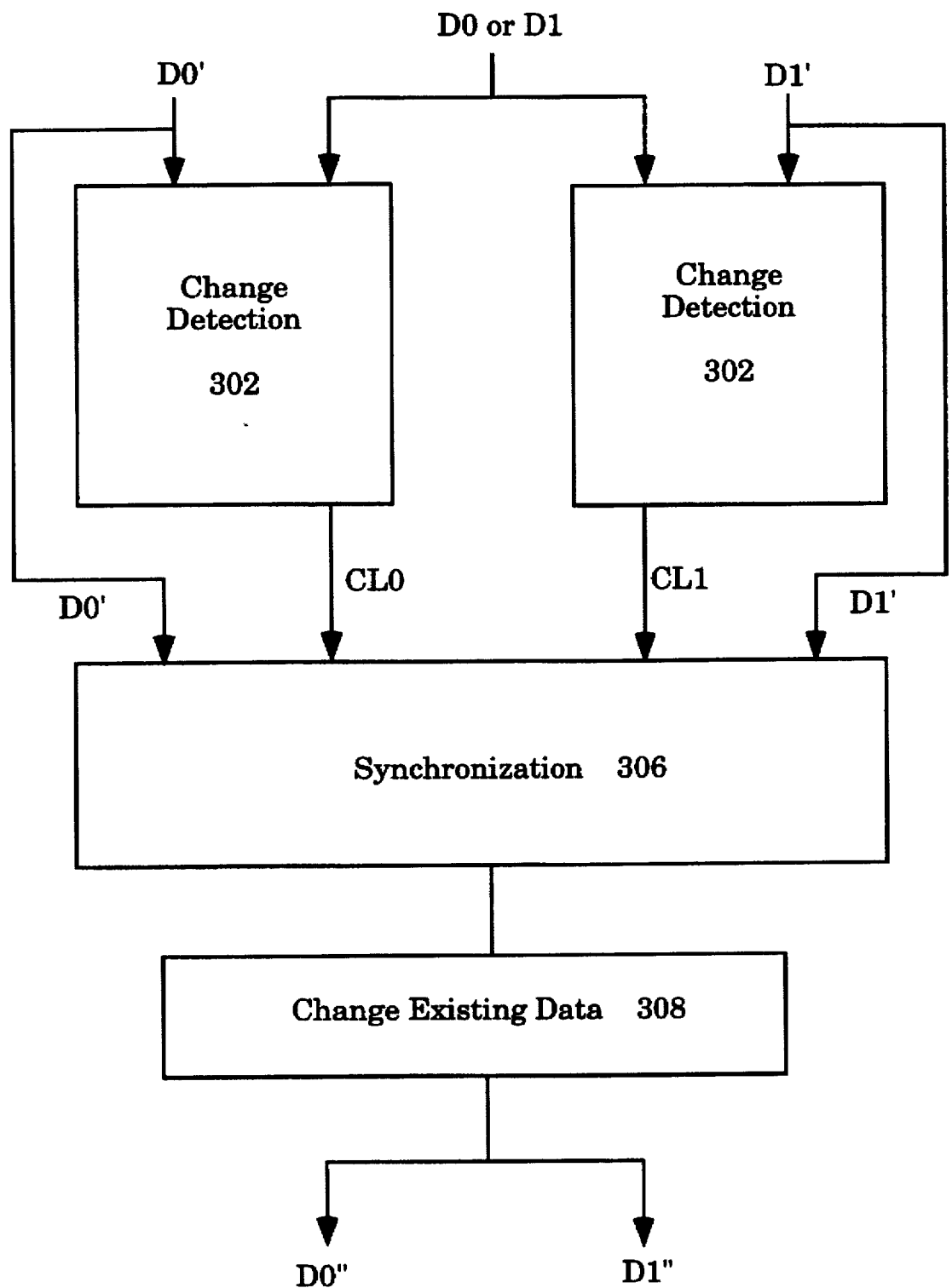
FIG. 4a is a block diagram illustrating an exemplary synchronization apparatus of the present invention.

FIG. 4a illustrates an exemplary sync apparatus of the present invention. The apparatus has Change Detection mechanism 302 with inputs of data sets D0', D1' and D0 or D1. Change Detection mechanism 302 produces Change List CL0 for D0 and D0' and Change List CL1 for D1 and D1'. A Change List (CL) is a list of record changes for a given data set (described in more detail in the description accompanying FIG. 4c below). Synchronization mechanism 306 is fed inputs D0', D1' and newly produced Change Lists CL0 and CL1. The output of Synchronization mechanism 306 is input to Change Existing Data 308 to produce synchronized data sets D0" and D1".

Figure 4B:
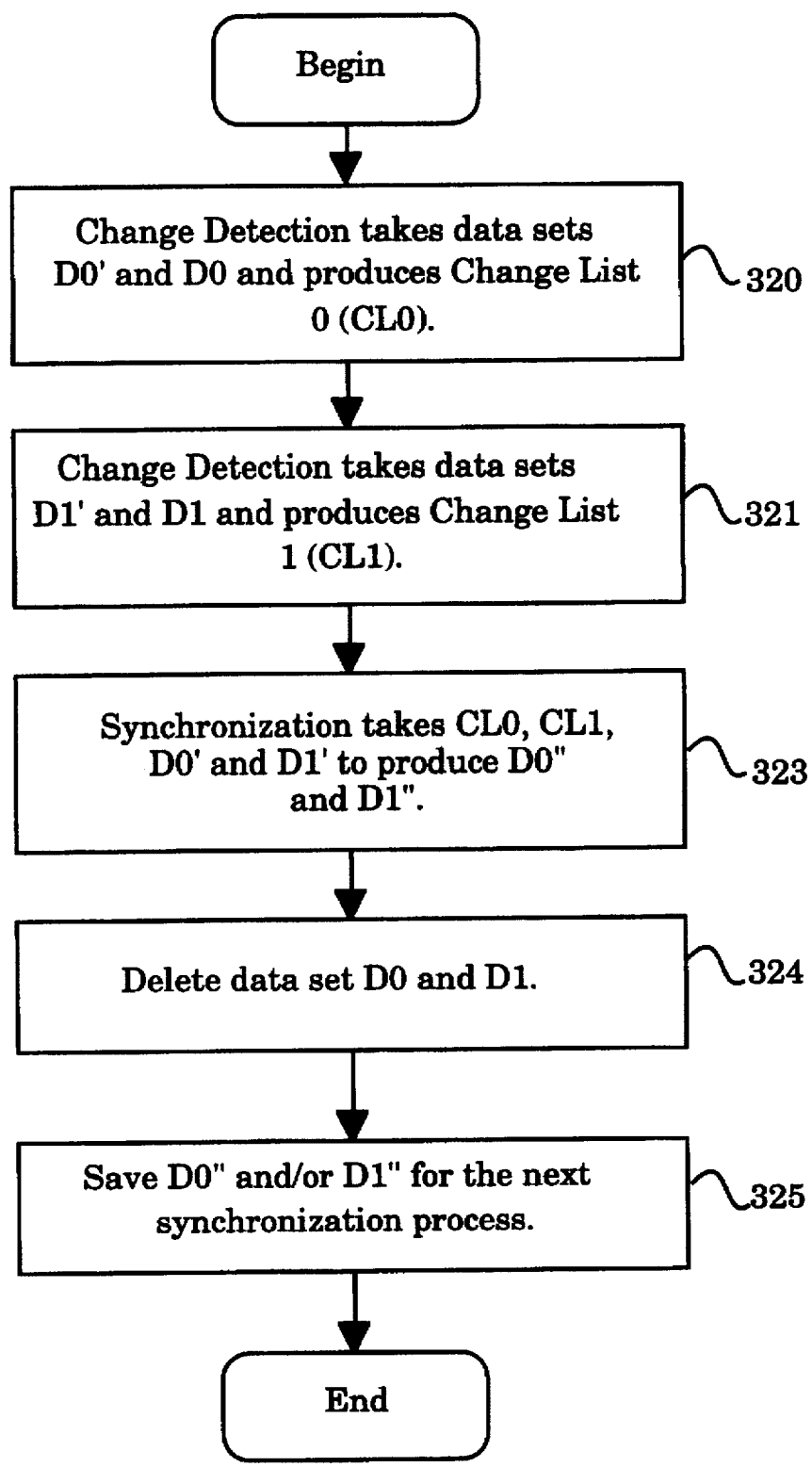
FIG. 4b is a flow diagram illustrating the general steps followed by the apparats illustrated in FIG. 3.

FIG. 4b is a flow diagram illustrating the general steps followed by the synchronization apparatus of the present invention referenced in FIG. 4a. In step 320, data sets D0, D1, D0' and D1' are input to Change Detection mechanism 302. Data sets D0 and D1 are equivalent and may be the same file or non existent. D0' and D1' are a version of D0 and D1 after they have been independently modified. They are saved when synchronization was last run (i.e. when the last time steps 320 through 325 were performed), Change Detection mechanism 302 determines the changes which have been made to data sets D0' and D0 between synchronizations to produce Change List CL0. In step 321, Change Detection mechanism 302 performs the same operation to produce Change List CL1 from data sets D1' and D1. In step 323, Synchronization mechanism 306 takes as input, CL0, CL1, D0' end D1'. The result of Synchronization mechanism 306 is input to Change Existing Data 308 to produce synchronized data sets D0" and D1". In step 324, original data sets D0 and D1 are deleted. In step 325, D0" and/or D1" are saved as D0 end D1 for the next synchronization process.

FIG. 4c illustrates exemplary data structures for Change Lists CL0 and CL1. In an exemplary data structure for CL0, column 330 contains the original records from data set D0. Only the records which have been updated or deleted are listed in this column. Column 331 contains the status of the record of the corresponding row and indicates whether the corresponding record has been updated or deleted. An entry is also made for records which have been newly created.

For those records which have been created or updated, a corresponding new record in data set D0' produced as a result of the update or create is listed in column 332. Thus, a record Rm from D0 which has been updated produces an updated record Rm' in data set D0' in column 332. Deleted record Rp from D0 is not present in D0' as illustrated by the corresponding blank entry in column 332. Newly created record Ru is listed as a new record in data set D0' in column 332.

Finally, column 333 indicates whether the synchronization has taken place. The entries for this column initially indicates "no" for corresponding records which have not been processed by Synchronization mechanism 306 (see FIGS. 9a–9e for the general steps followed by Synchronization mechanism 306). After processing by Synchronization mechanism 306, the column entries are changed to "yes" to indicate that the corresponding record has been synchronized.

The exemplary data structure illustrated for CL1 has columns 334 through 335 and has the same structure as was described for CL0.

In the exemplary Change List (CL) described above, records may be marked as Created, Updated, Deleted or Created_Deleted. The Change List lists the changes made to a data set (e.g. D0) to produce a modified data set (e.g. D0'). Thus if a record in D0 was Deleted or Updated, the change is reflected in CL0, the Change List showing the differences between D0 and D0'. If a new record not in D0 was Created in D0', this is reflected in CL0 as well.

Although a combination of the operations, Created, Updated and Deleted, may be applied to a record, only the end result at the time of the next synchronization is relevant for the Change List. This may be illustrated with an exemplary data set D0'. Data set D0' contains the final form of each record before the next synchronization and is a data set containing all the changes made to an original data set D0. If a record Ru was created in D0', then modified, the correct change appearing on the Change List CL0 for D0 and D0' is Created since the original version of the data set D0 did not contain Ru. Thus, even if Ru was modified after creation in data set D0', for the purposes of listing the changes made between the original data set D0 and the modified version D0', the difference represented in the list is that a new record Ru was created.

If a record was created in D0' and then deleted (Created_Deleted case), the record should not appear in the Change List at all, if the Change List is generated retroactively. In the same fashion, if a record was modified and then deleted, the record should appear in the Change List as Deleted. Change Detection method 302 generates correct answers for all of these cases, as well as any combination of the above.

Figure 5A:
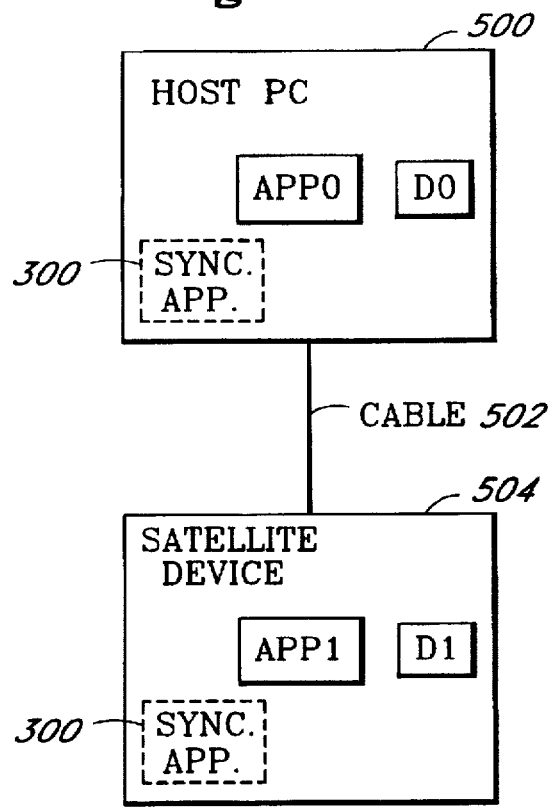
FIGS. 5a–5c are alternate embodiments of a system block diagram illustrating the synchronization method and apparatus of the present invention.
Figure 5B:
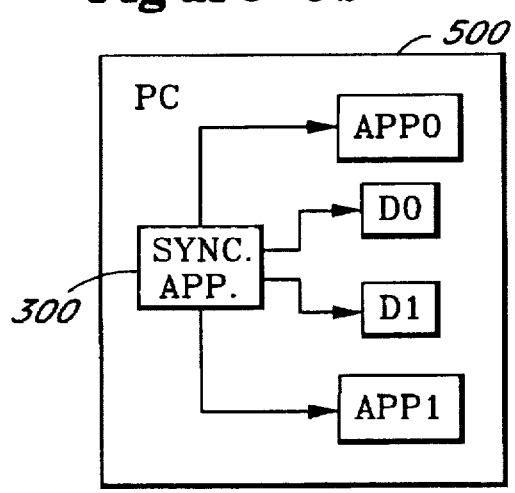
Figure 5C:
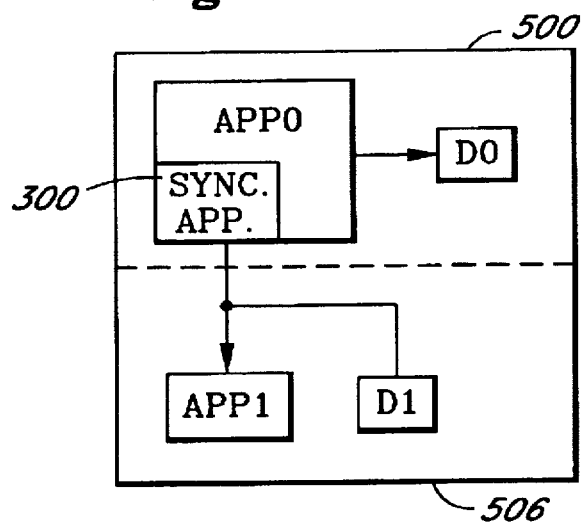

FIGS. 5a–5c are exemplary embodiments of a system block diagram with the implementation of the synchronization method and apparatus of the present invention. The present invention may be used to synchronize data between data sets D0 and D1, belonging to application app0 and application app1 respectively. A variety of configurations are possible. For example, D0 may reside in a satellite device (e.g. a notebook or a hand held computer, such as an Apple® Newton, a Sharp® Wizard, or a Caslo® BOSS) and D1 may reside on a host computer (e.g. a desktop or a notebook PC) as illustrated in FIG. 5a. Further, D0 and D1 may reside on the same system as illustrated in FIG. 5b. D0 and D1 may also reside on two different PC's linked by a computer network as illustrated in FIG. 5c. In addition, app0 and app1 may be the same application. The present invention may be implemented for synchronization of any two or more data sets and is not limited to the exemplary configurations illustrated herein.

More specifically, FIG. 5a illustrates an embodiment of the present invention where neither app0 nor app1 generates a Change List (CL). Host PC 500 is coupled to satellite device 504 via cable 502. Sync mechanism 300 may reside on either host PC 500 or satellite device 504 or on both.

In an alternative embodiment, one of the applications, app0 or app1, may support synchronization by generating a Change List (CL). In this embodiment, the flow diagram in FIG. 4b may be changed such that a Change List for D0' from app0 is retrieved at step 320.

FIG. 5b illustrates an embodiment where Sync mechanism 300 is implemented as an application residing on PC 500 separate from the applications being synchronized. This allows users to synchronize data between existing installed applications without having to buy new versions of their applications. Further, users do not have to wait for application vendors to add synchronization support to their applications. The only requirement for this embodiment is that the applications being synchronized provide a means for a third party apparatus to import and export data to and from their native data formats.

Examples of such means include but is not limited to: published file format, application programming interface (API), specialized interface such as Standard Query Language (SQL) used by databases, Dynamic Data Exchange (DDE), or some communication protocol for transferring information to and from a mobile or remote device. The details on how to implement the importation and exportation of data to and from an application using published formats are application specific and well understood by those skilled in the art.

In an alternative embodiment illustrated in FIG. 5c, Sync mechanism 300 is implemented as part of one of the applications residing on PC 500 and involved in the synchronization. The only requirement here is that app1 (residing on PC 506) with which app0 (residing on PC 500) is to be synchronized must provide a means for a third party apparatus to import and export data to and from their native formats.

In yet another alternate embodiment, Sync mechanism 300 may be implemented as part of both app0 and app1, and a predefined communication protocol is used to exchange information such as for a Change List. Other embodiments are possible and are included in the scope of this invention. For these alternative embodiments, the apparatus and methods of the present invention are unchanged, and the only difference is in how the apparatus is packaged. Given the present invention, how the apparatus may be packaged will be readily understood by a person skilled in the art.

Since the synchronization method of this invention is only concerned with the end resulting difference between D0' and D0, rather than the history of all changes that might have happened, a synchronization aware application (such as App1 in FIG. 5c) need not keep a traditional log of all activities for each record. Instead, it is safe to truncate the log such that only the most recent relevant changes are kept. The state transition diagrams in FIGS. 5d and 5e illustrate how the log or more specifically, a Change List as referred to herein, can be truncated such that there is exactly one change flag marked for each record. Truncating the Change List is desirable because it reduces the amount of storage required for the Change List. This is particularly important for memory limited devices, such as hand held computers.

In FIG. 5d, after synchronization at state 530, all records are marked "No Change." A "No Change" record may transition to either "Updated" or "Deleted." In state 532, an "Updated" record stays "Updated" unless it becomes "Deleted". In state 534, a "Deleted" record always remains "Deleted."

In FIG. 5e, a newly created record is marked "Created" as illustrated in state 540 and remains "Created" unless it is later deleted. If a "Created" record is deleted, it is marked "Created_Deleted" in state 542. Even if a new record is later modified, it is still marked "Created" for synchronization purposes. Created_Deleted records are transient and are always ignored during synchronization.

Figure 6:
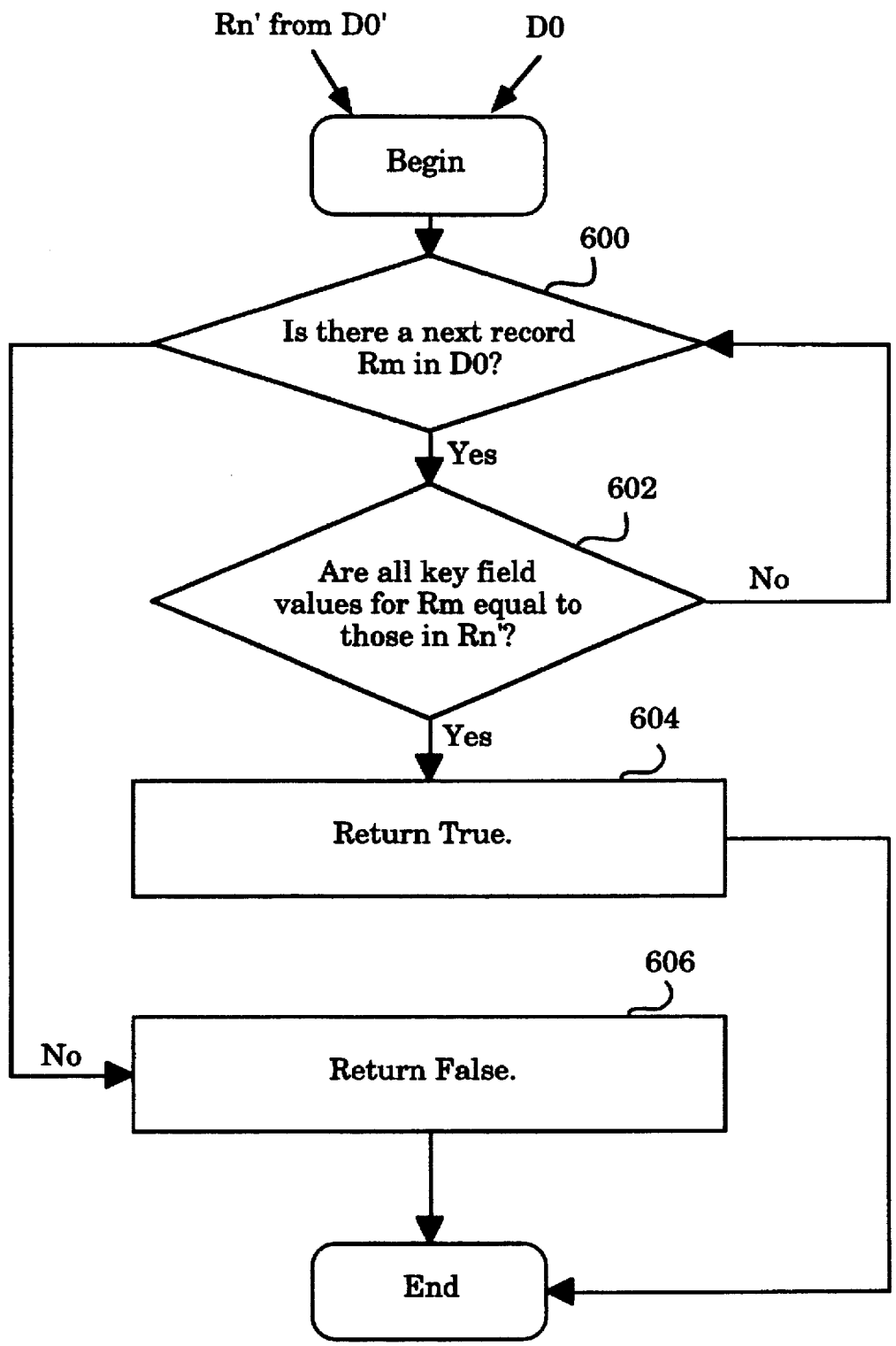
FIG. 6 is a flow chart describing the general steps followed by the SUID mechanism referred to in FIG. 3.

FIG. 6 is a flow chart describing the general steps followed by the SUID mechanism referenced in FIG. 3. SUID mechanism 304 identifies records which do not have system assigned unique identifiers. More specifically, each record is a collection of one or more data items, called fields. SUID mechanism 304 identifies records by one or more fields (referred to as Key Fields) whose contents are likely to be different for different records. For example, Record A is determined to be a different record from Record B if one or more of their Key Fields are different. The comparison procedure itself may be readily understood by those skilled in the art.

Based on the semantics of the data, the Key Fields to be compared may be selected manually by the programmer at design time. For example, for a data set of address book records with a first name field and a last name field, the combination of the two fields is a unique identifier for the record. These fields can also be selected automatically using a program which scans some sample data and analyzes which field has a high probability of being unique across different records. Methods for determining uniqueness, given two data entries, for example, two fields are well known in the art.

In the absence of Key Fields, Error Correction 305 alone is sufficient since it effectively uses all fields in a record to identify a record. Key Fields are a useful way for enhancing performance because typically only the Key Fields must be compared rather than all the fields, but Key Fields are not required for this invention.

In the flow diagram, data set D0 and record Rn' from data set D0' are input to SUID mechanism 304. In step 600, if there is a next record Rm in D0, and in step 602, if all Key Field values for Rm are equal to those in Rn', then in step 604, return TRUE to indicate a match between the Key Fields of records Rn' and Rm of the data sets to be synchronized (i.e. D0' and D0). Otherwise, loop back to step 600 and retrieve the next record Rm from saved data set D0. If no match was found after Rn' has been compared to all records Rm in D0, then in step 606, return FALSE indicating a no match result.

Figure 7A:
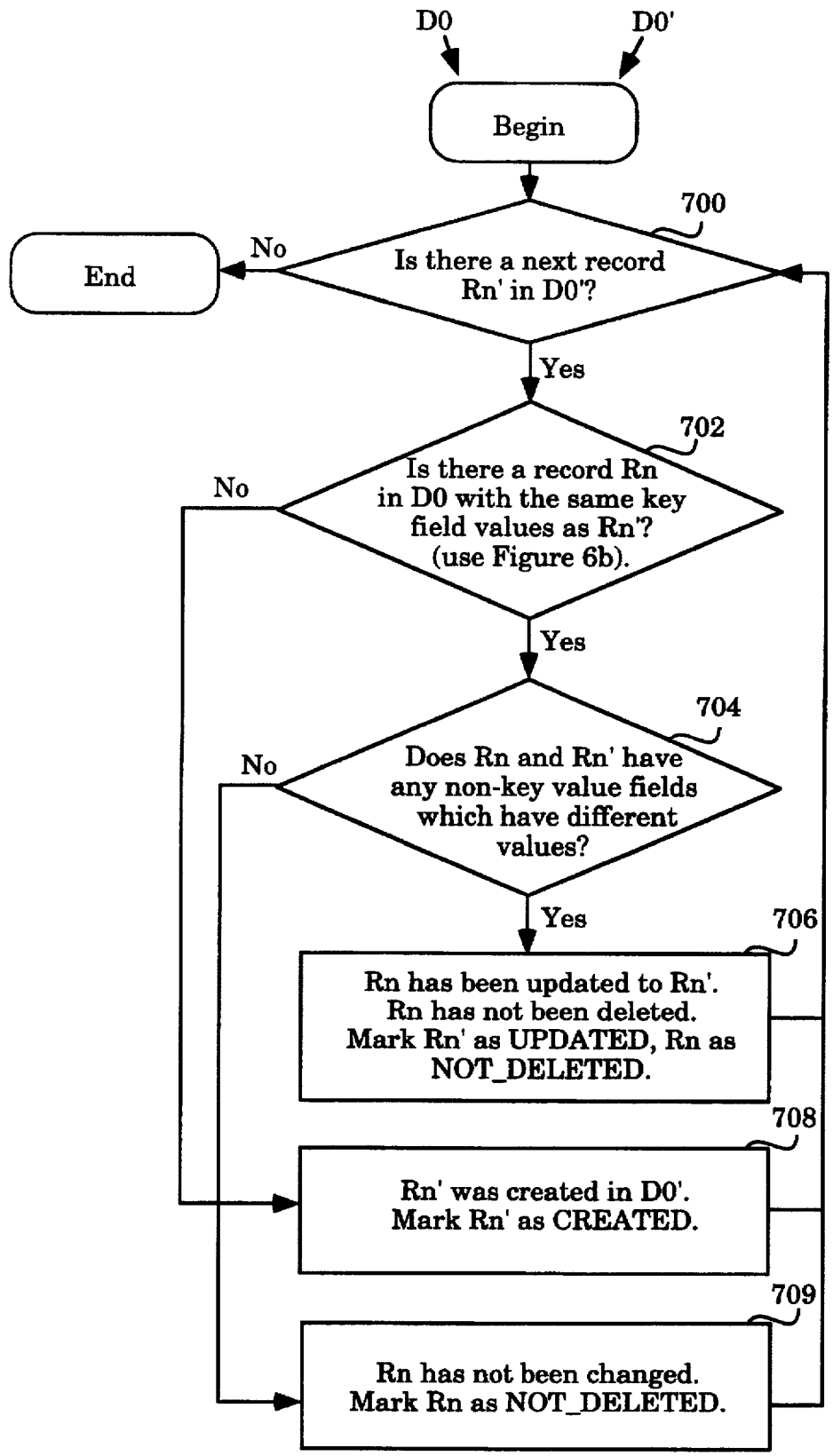
FIGS. 7a and 7b are flow charts describing the general steps followed by the Change Detection mechanism referred to in FIG. 3.
Figure 7B:
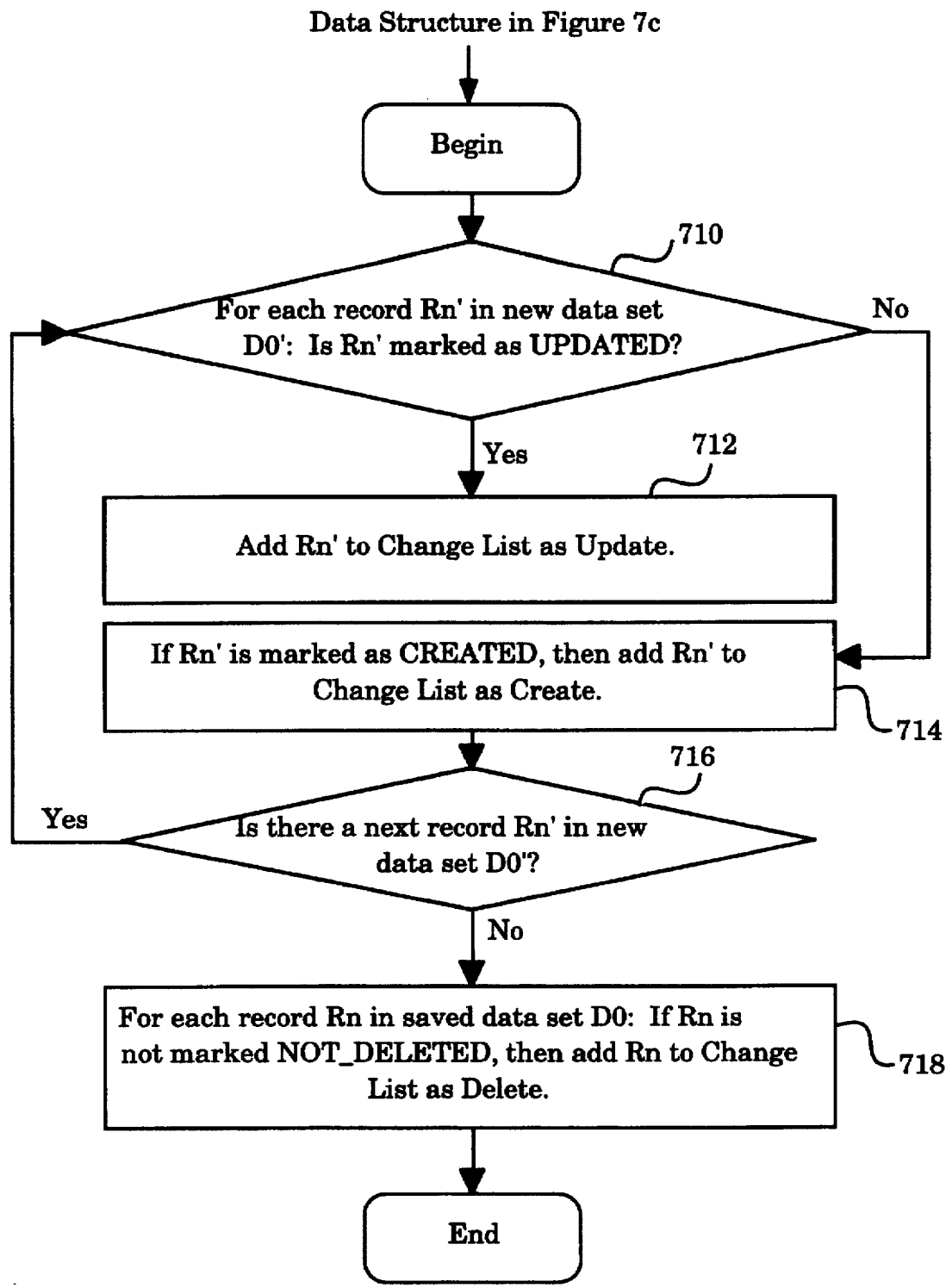

FIGS. 7a and 7b are flow diagrams describing the general steps followed by the Change Detection mechanism referenced in FIG. 3. Change Detection mechanism 302 deduces all the changes that have occurred in a given data set since the last synchronization. This is accomplished by first saving a copy of the data set at the end of a synchronization. At the next synchronization, the records are compared in the modified data set (e.g. D0') with the saved data set (e.g. D0), detecting the changes which must have happened since the last synchronization. In the case where the synchronization is run for the first time, there are no records in the saved data set (e.g. D0), and Change Detection mechanism 302 concludes that all current records have been created.

The steps followed by Change Detection mechanism 302 begins with FIG. 7a where first, data sets D0 and D0' are input to Change Detection mechanism 302. In step 700, if there is a next record Rn' in data set D0', then in step 702, it is determined if there is a record Rn in D0 with the same Key Field values as Rn' (this is determined using the steps illustrated in the flow diagram of FIG. 6). If there is a record Rn in D0 with the same Key Field values as Rn' and in step 704, if Rn and Rn' have non-key value fields which have different values, then in step 706, it is determined that Rn has been UPDATED to Rn' and Rn' is marked as UPDATED. In addition, since Rn has been UPDATED, it is determined that Rn has not been deleted and Rn is marked NOT_DELETED.

If records Rn and Rn' have the same values for all their Key Fields and non-Key Fields, then it is determined that Rn' has not been changed and Rn is marked as NOT_DELETED in step 709. In step 708, if there are no records Rn in D0 with the same Key Field values as Rn', then Rn' is a new record created in D0' and Rn is marked CREATED. If there is a next record Rn' in D0', then return to step 700 until there are no more records Rn' in new data set D0'.

After all the records in data set D0' have been processed, all the records in D0' become marked as either UPDATED or CREATED, and some records in D0 become marked as NOT_DELETED.

In FIG. 7b, in step 710, for each record Rn' in new data set D0', if Rn' is marked UPDATED then in step 712, Rn' is added to Change List as Update. Otherwise, if Rn' is marked CREATED, then in step 714, Rn' is added to Change List as CREATED. In step 716, if there is a next record Rn' in the new data set D0', then the next record Rn' in the new data set D0' is processed until there are no more records Rn' left to be processed. In step 718, for each record Rn in the saved data set D0, if Rn is not marked NOT_DELETED, then in step 718, Rn is added to Change List as DELETED. The process is repeated until all records Rn in the saved data set D0 are processed.

A Change List CL0 for original data set D0 and modified data set D0' reflecting the changes made from D0 to D0' has now been generated by Change Detection mechanism 302. (Refer to the exemplary CL0 data structure in FIG. 4c and FIG. 7c for illustration.) There are two conditions which may be encountered by Error Correction mechanism 305 which require Change Detection mechanism 302 to generate a Change List by working with Error Correction mechanisms one and two. Error Correction mechanisms one and two are described in more detail in the descriptions accompanying FIGS. 8a through 8d below.

Figure 7C:
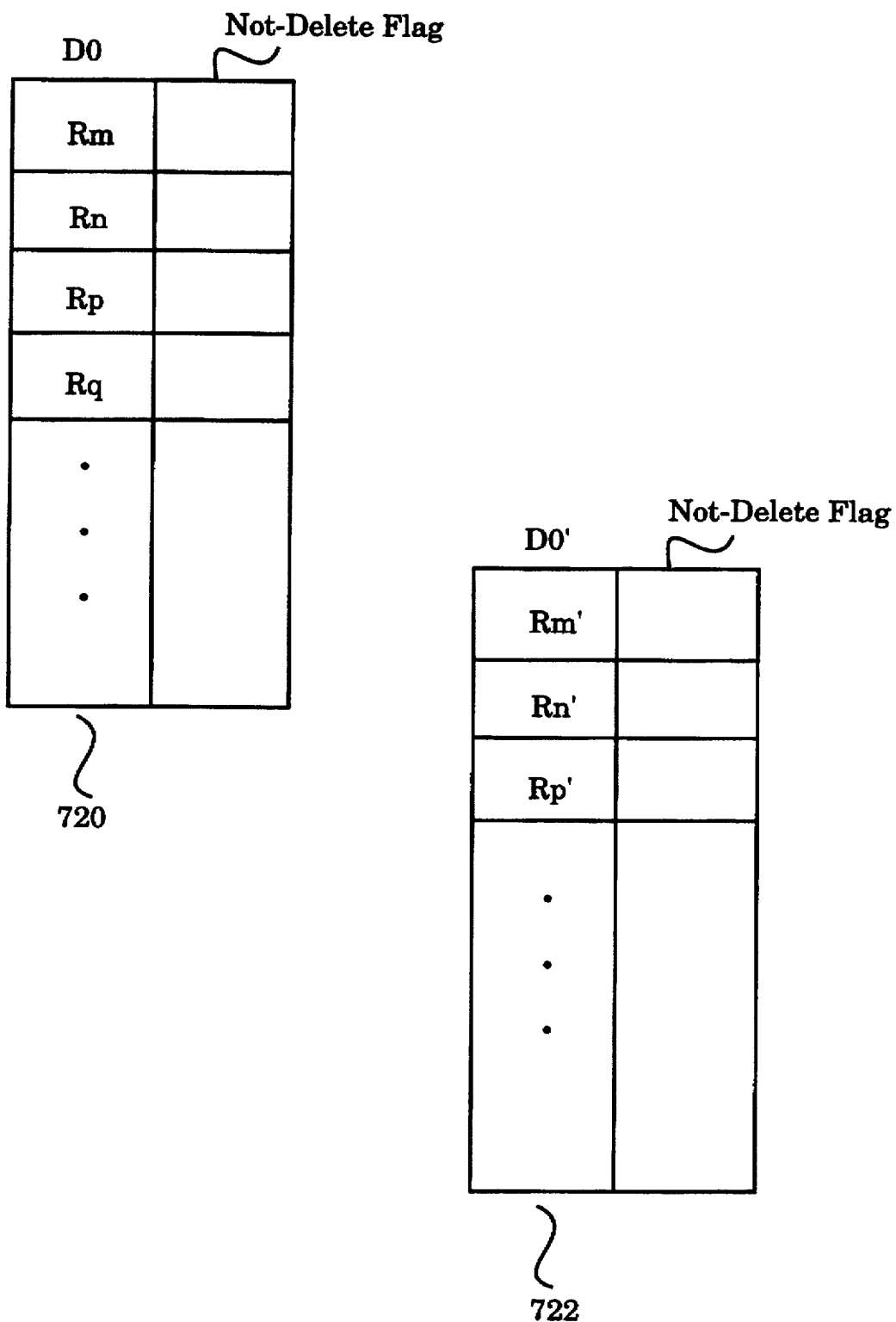

FIG. 7c illustrates an exemplary Change List data structure modified by the steps described in FIG. 7a. Data structure 720 contains a list of records Rm, Rn, Rp, Rq, etc. (contained in data set D0) as well as a corresponding list of NOT_DELETE flags. Data structure 722 contains a list of records Rm', Rn', Rp', etc. (contained in data set D0') as well as a list of corresponding NOT_DELETE flags.

FIGS. 8a through 8d are flow charts describing the general steps followed by Error Correction mechanism 305 referenced in FIG. 3. In the Figures, the functions of Error Correction mechanism 305 is divided into two parts and will be referred to as Error Correction mechanisms one and two.

There are two error conditions which may be encountered by Error Correction mechanism 305. Error case 1 is where a record's Key Field changes in data set D0'. Error case 2 is where more than one record is sharing the same Key Field values (a non-unique identifier case).

In error case 1, the correct result to be produced by Change Detection mechanism 302 is that Rn' is Updated. Since the Key Field is changed during the synchronization process, assuming the changed Key Fields are still unique, Change Detection mechanism 302 deduces that Rn was Deleted, and Rn' was Created. A Delete and a Create is equivalent to an Update, since Rn' also contains all the unmodified fields in Rn, as well as any fields a user or an application normally chooses not to synchronize. Thus no correction is needed. The case where Rn's Key Fields are the same as one or more other record's Key Fields is handled as an error case 2 described below.

For error case 2, Change Detection mechanism 302 deduces incorrect Updates and Creates. For example, assuming that records R1 and R2 have the same Key Field values and that R1' and R2' are unchanged, i.e. R1' has all the same fields as R1 and R2' as R2. If Change Detection mechanism 302 is run on R2' before R1', it is possible for SUID mechanism 304 to erroneously determine that R1 has been updated to R2' and that R2 has been updated to R1'. The correct determination which should be made by SUID mechanism 304 is that neither R1 nor R2 has changed. Similarly, if R1' is unchanged but R2' has changed, it is possible for Change Detection mechanism 302 to determine that R1 has been updated to R2' and R2 has been updated to R1'. In either case, after results are produced by Change Detection mechanism 302, if R1 or R2 contains fields not normally synchronized, R1's unsynchronized fields would be exchanged with R2's unsynchronized fields.

The invention corrects error case 2 using two procedures. In one procedure, SUID mechanism 304 first looks for a duplicate in D0. If a duplicate exists in D0, it is marked DUPLICATE_EXISTS as well as NOT_DELETED. In subsequent searches, SUID mechanism 304 ignores any records in D0 already marked as DUPLICATE_EXISTS. SUID mechanism 304 will then return one of three possible results, DUPLICATE, CONFLICT, or NOT_FOUND. DUPLICATE is returned when there exists, for example, a record Rx in D0, for which all fields match with record Rn' in D0'. CONFLICT is returned when there exists a record, for example, Rx in D0, for which all Key Fields match with record Rn' in D0' but one or more other fields are different. NOT_FOUND is returned when there is no record in D0 for which all Key Fields matches with those for Rn' in D0'. This error correction mechanism for SUID mechanism will herein be referred to as Error Correction one.

The second procedure for correcting an error case 2 is as follows. In Error Correction one, when a CONFLICT is found, the conflict record Rx in D0 is also marked as CONFLICT_EXISTS, and an internal reference to record Rn' is stored in D0' for which Rx is a conflict. For future records seen in Error Correction one, if a DUPLICATE is found for a record already marked as CONFLICT_EXISTS, record Rx is marked in D0 as DUPLICATE_EXISTS. Rn' is then retrieved and steps 700 to 706 of the flow diagram illustrated in FIG. 7a is performed on Rn' by Change Detection mechanism 302. Change Detection mechanism 302's error correction mechanisms will herein be referred to as Error Correction two. Error Correction one and two work together as described below.

Figure 8A:
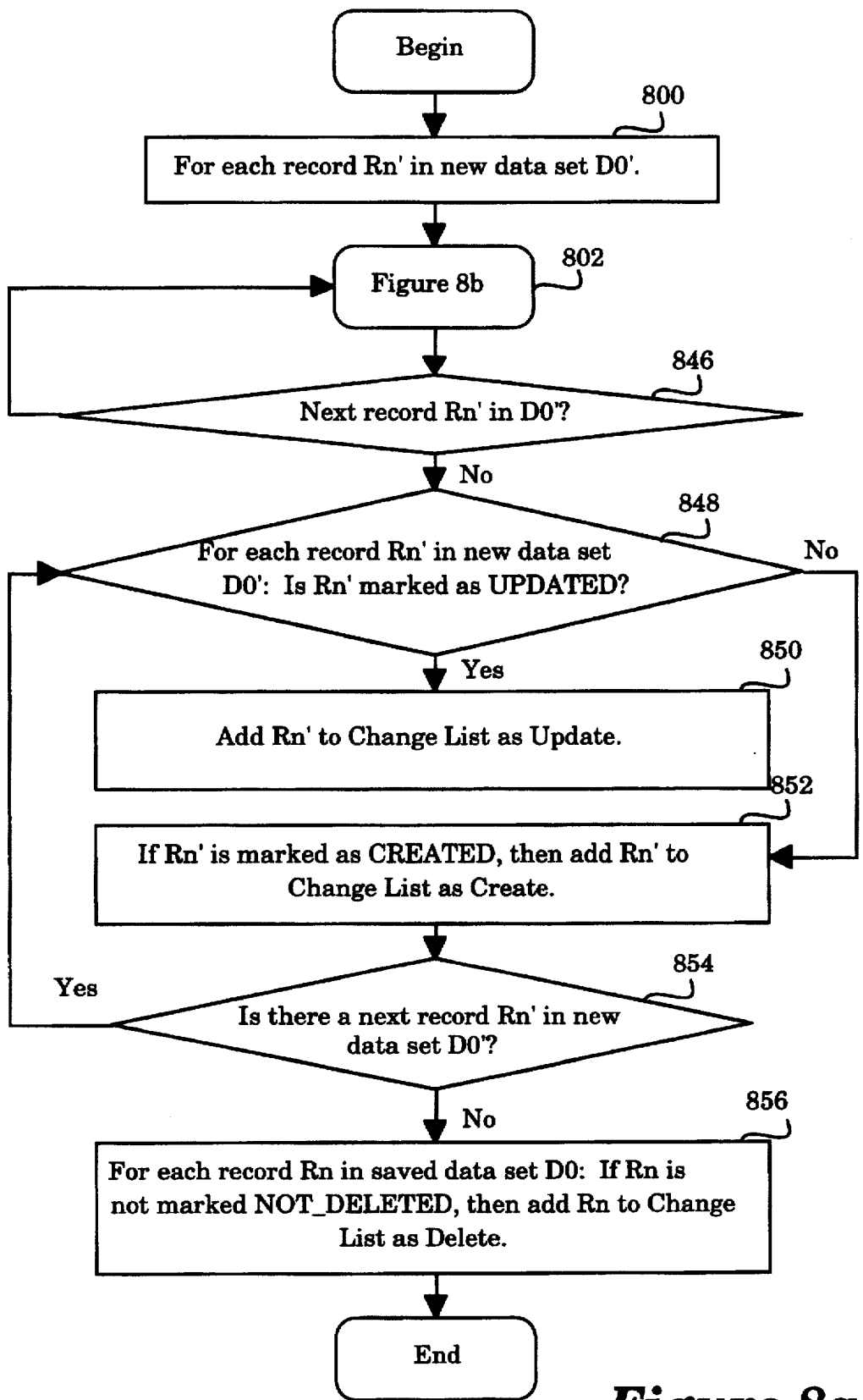
FIGS. 8a–8d are flow charts describing the general steps followed by the Error Correction mechanism referred to in FIG. 3.
Figure 8B:
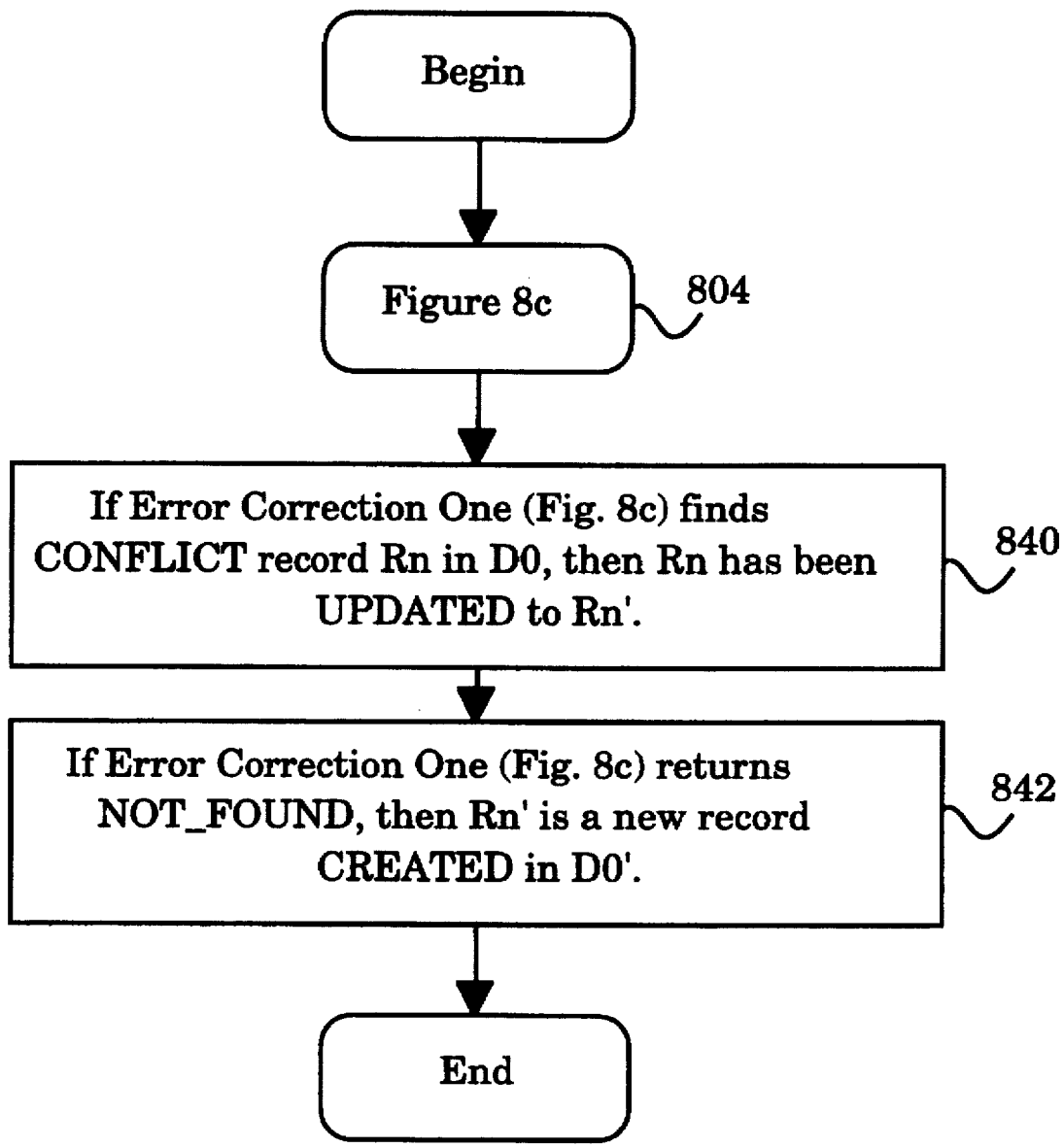

In FIG. 8a, Error Correction mechanism two takes as input, data sets D0 and D0'. In step 800, for each record Rn' in new data set D0', the general steps illustrated in FIG. 8b are performed on Rn'. In FIG. 8b, the general steps illustrated in FIG. 8c is first performed with input of Rn'.

Figure 8C:
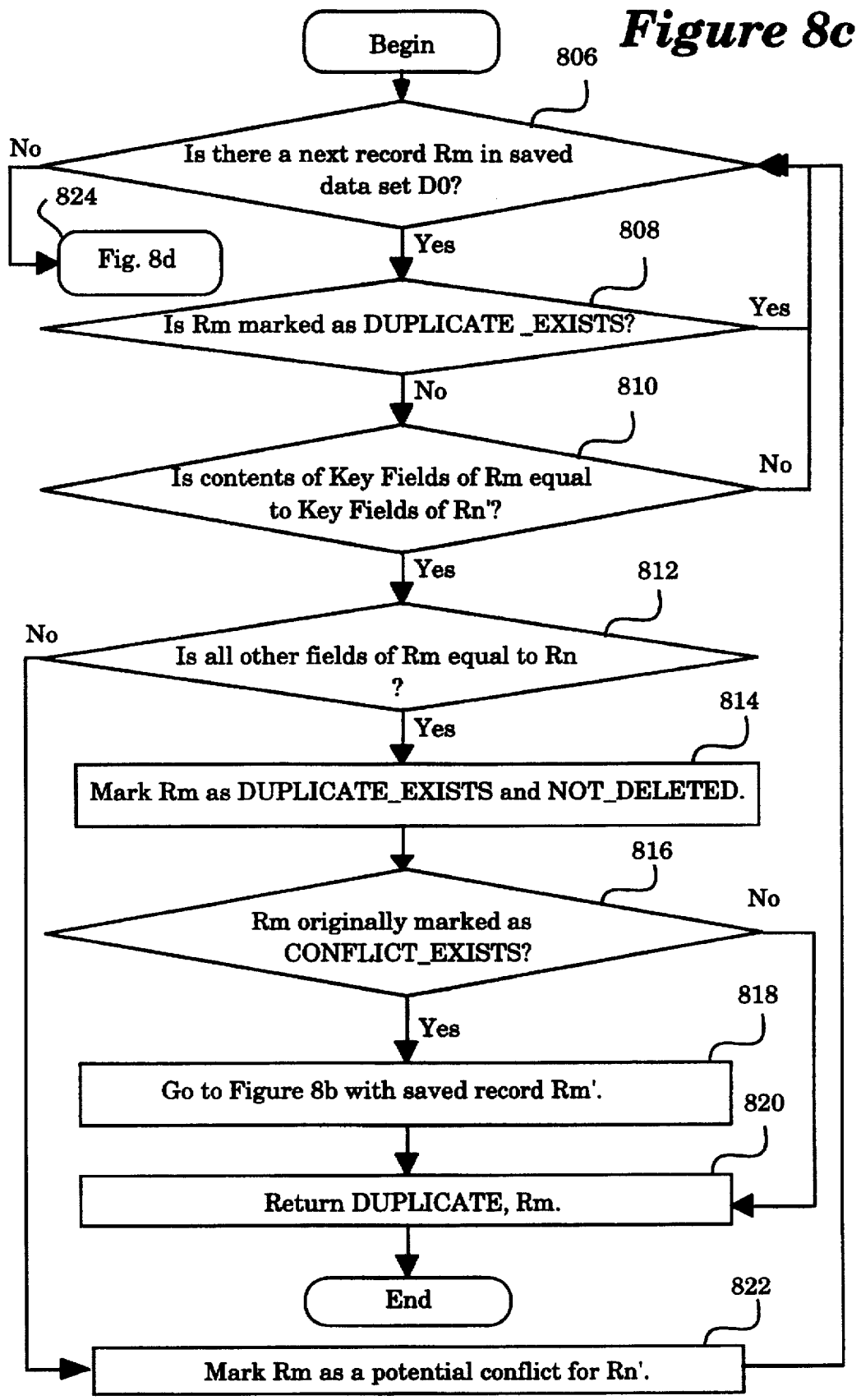
Figure 8D:
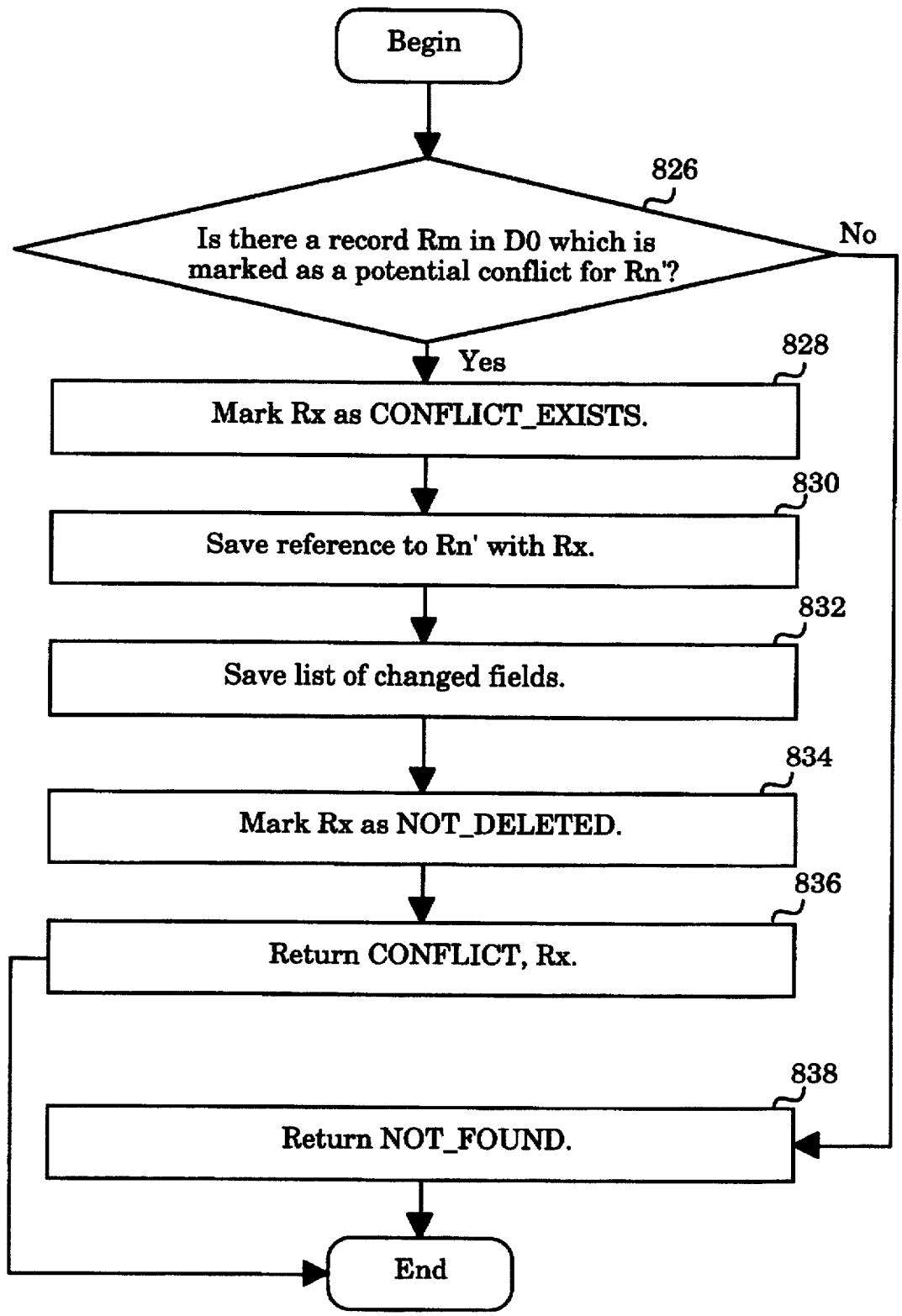

FIGS. 8c and 8d illustrate the general steps followed by Error Correction one. In FIG. 8c, in step 806, given input Rn' in D0', for each record Rm in saved data set D0, it is determined in step 808, if Rm is marked as DUPLICATE_

EXISTS. If Rm is marked as DUPLICATE_EXISTS, then the next record Rm in D0 is processed back in step 806. Otherwise, in step 810, if the contents of the Key Fields in Rm are equal to the contents of the Key Fields in Rn', and in step 812, if all other fields of Rm are equal to Rn', then in step 814, Rm is marked with DUPLICATE_EXISTS and NOT_DELETED. In step 816, if Rm was originally marked CONFLICT_EXISTS, then the steps in the flow diagram of FIG. 8b are followed with the saved record Rm' as input. In step 820, DUPLICATE is returned for record Rm.

Back in step 812, if the contents of the Key Fields of Rm are equal to the contents of the Key Fields of Rn' but one or more non-key fields of Rm are not equal to Rn', then in step 822, Rm is marked as a potential conflict for Rn'. Back in step 806 the process illustrated in FIG. 8c are repeated until all records Rm in saved data set D0 are processed. After all records Rm are processed, the general steps illustrated in FIG. 8d are performed in step 824.

In FIG. 8d, in step 826, if there is a record Rm which is a potential conflict for Rn', then in step 828, Rm is marked as CONFLICT_EXISTS, in step 830. Rm is also marked with a reference to Rn' reflecting the record with which Rm has a conflict. In step 832, a list of changed fields are saved. In step 834, Rm is marked as NOT_DELETED. In step 836, CONFLICT for record Rm is returned. Back in step 826, if there are no records Rm which is a potential conflict for Rn' as determined in FIG. 8c, then NOT_FOUND is returned. The Key Fields may also have no values. This is a valid entry and multiple records with no values for the Key Fields are handled the same way as described above.

Back in FIG. 8b, in step 840, if Error Correction one (described in the flow diagrams of FIGS. 8c and 8d) finds CONFLICT for record Rn in D0, then it is determined that Rn has been UPDATED to Rn'. Otherwise, in step 842, if Error Correction one returns NOT_FOUND, then it is determined that Rn' is a new record CREATED in D0'.

Back in FIG. 8a, after all the records in data set D0 have been processed through steps 800, 802 and 846, all records in D0' have been marked as either UPDATED or CREATED, and some records in D0 have been marked as NOT_DELETED. In step 848, for each record Rn' in new data set D0', if Rn' is marked UPDATED, then in step 850, Rn' is added to the Change List as UPDATED. Otherwise, in step 852, if Rn' is marked CREATED, then Rn' is added to the Change List as CREATED. After steps 848 through 854 are performed for all records Rn' in new data set D0' step 856 is performed. In step 856, for each record Rn in saved data set D0, if Rn is not marked NOT_DELETED then Rn is added to the Change List (CL0) as DELETED. A list of changes (Change List) from data set D0 to data set D0' is therefore generated by Change Detection mechanism 302 and by Error Correction mechanism 305.

FIGS. 9a through 9e are flow charts describing the general steps followed by the Synchronization mechanism referred to in FIG. 3. Records Rn and Rm are exemplary records in data set D0 and records Rx and Ry are exemplary records in data set D1.

Error Correction mechanisms one and two generate a list of changes when comparing a changed data set D0' to a saved data set D0. When synchronizing data sets D0' and D1', Error Correction two, first processes data sets D0' and D0, producing Change List 0 (CL0), and then processes data sets D1' and D1, producing Change List 1 (CL1). Data sets D0 and D1 may or may not be data from the same application or have the same format. However, data sets D0 and D1 are equivalent (i.e. synchronized) since they are saved at the end of the last synchronization and there may be only one data set saved.

Given accurate Change Lists CL0 and CL1 as produced by the present invention, techniques to modify D0' and D1' so that they become equivalent would be readily understood by those skilled in the art. FIGS. 9a through 9e and FIGS. 10a and 10b illustrate an exemplary method.

Figure 9A:
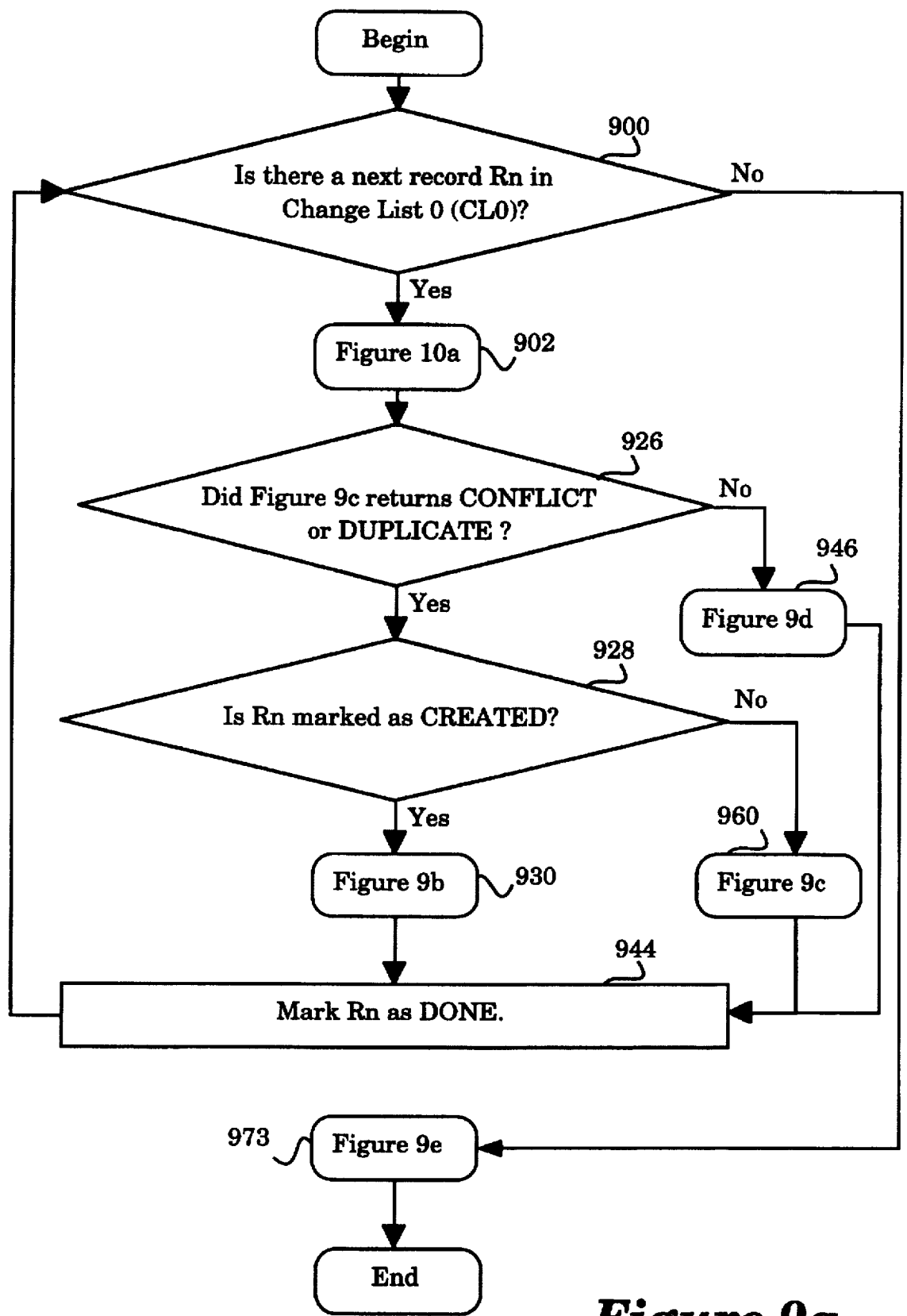
FIGS. 9a–9e, and 10a and 10b are flow charts describing the general steps followed by the Synchronization mechanism referred to in FIG. 3.
Figure 9B:
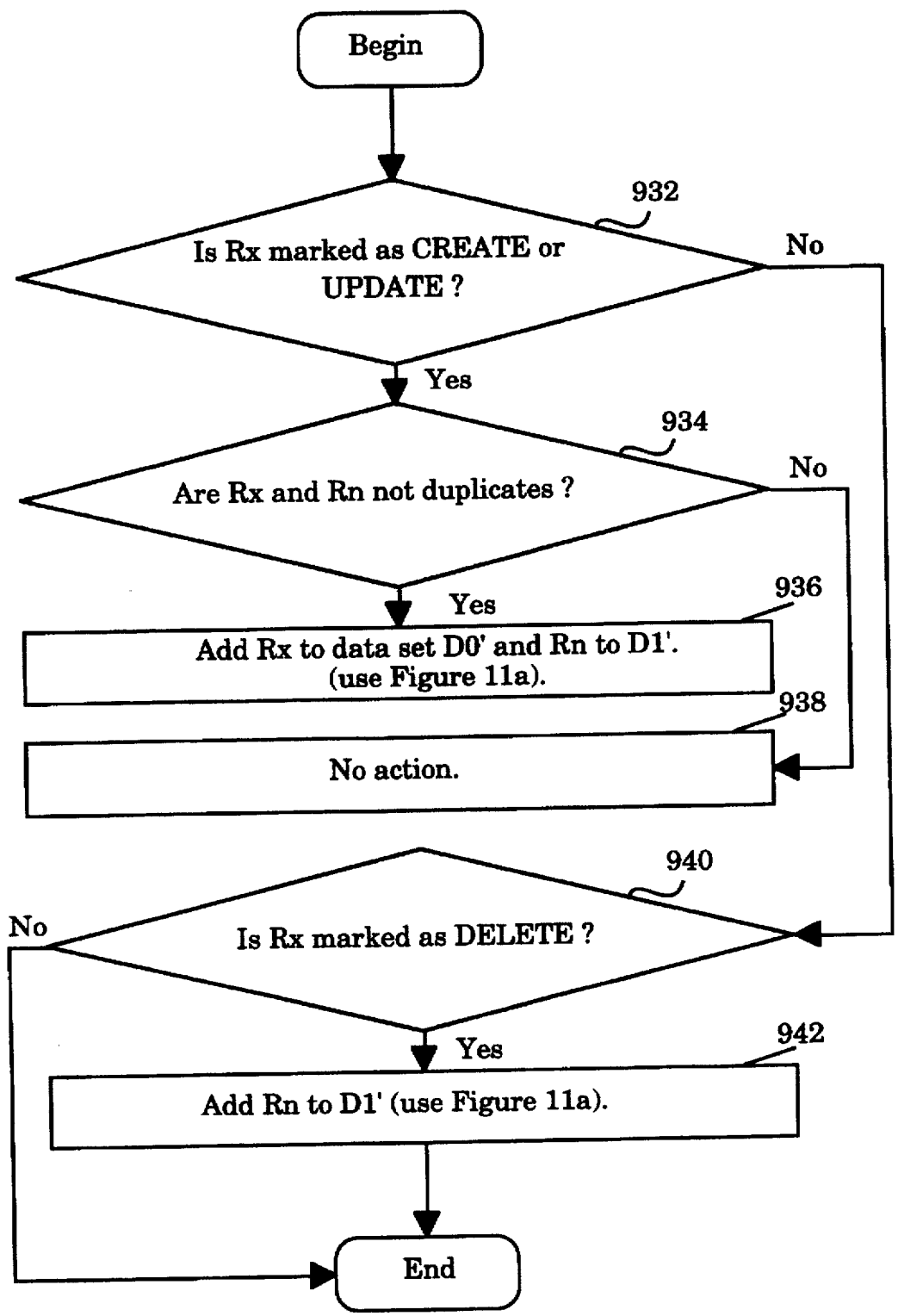
Figure 10A:
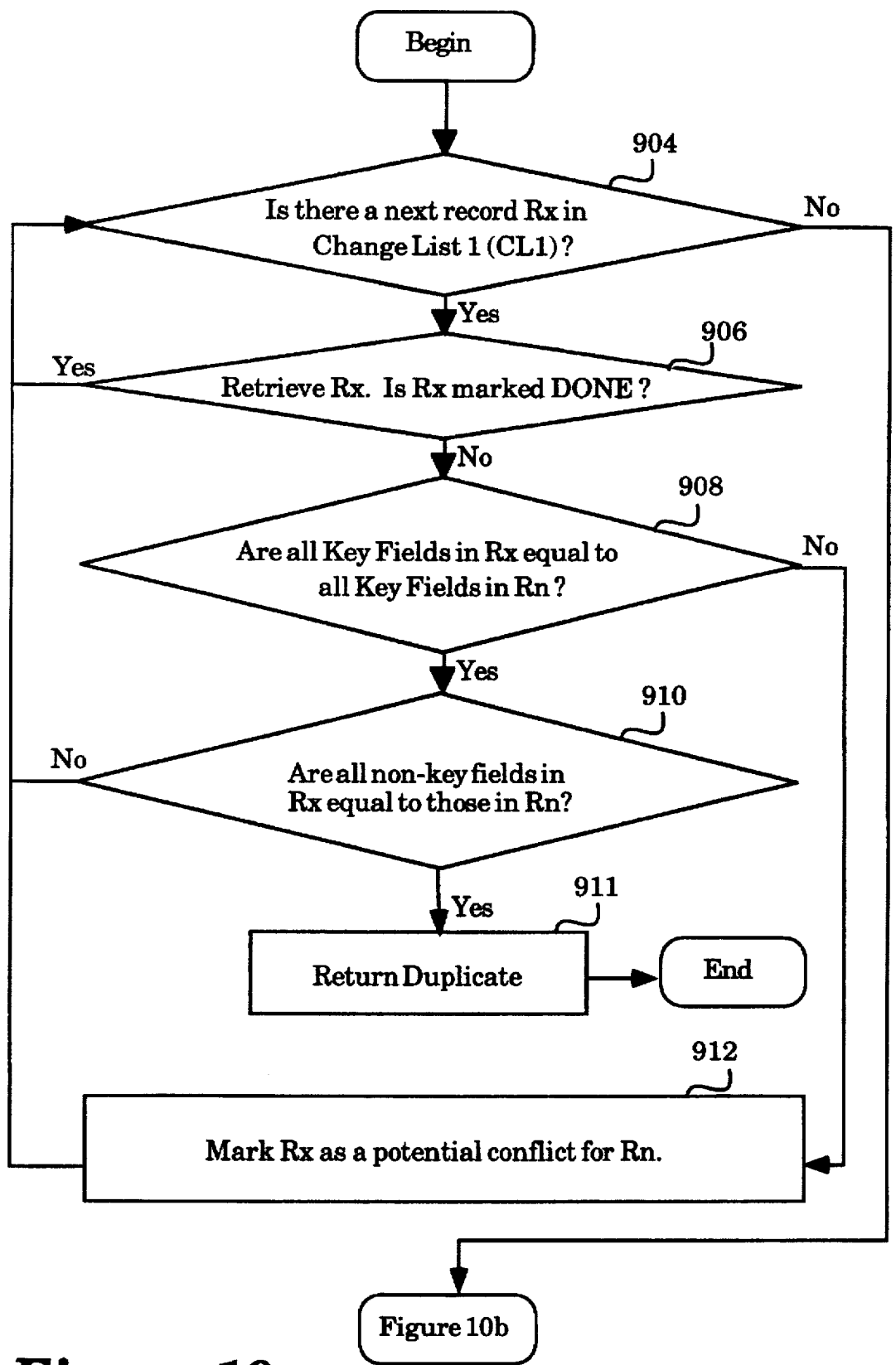
Figure 10B:
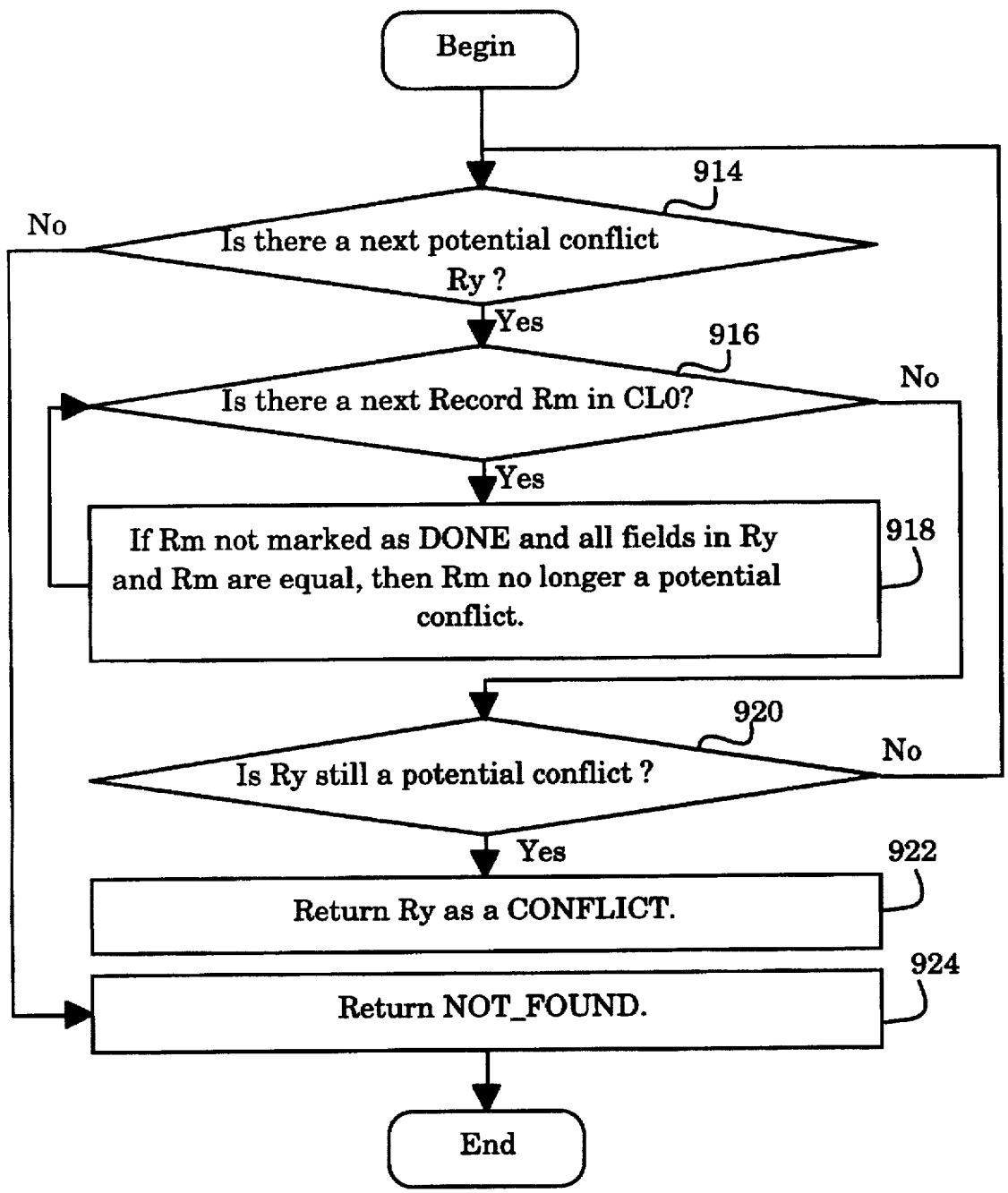

In FIG. 9a in step 902, the general steps illustrated in FIG. 10a and 10b are first performed for record Rn given Change List CL1.

In FIG. 10a, for each record Rx in CL1 in step 904, if Rx is not marked DONE in step 906, then in step 908, it is determined if all Key Fields in Rx are equal to all Key Fields in Rn. If all Key Fields in Rx are equal to all Key Fields in Rn, and in step 910, if all non-key fields in Rx are equal to those in Rn, then a flag indicating that a duplicate exists (DUPLICATE) is returned for Rx in step 911. Otherwise, if one or more key fields in Rx are not equal to those in Rn, then the process returns to step 904 to retrieve the next record Rx in CL1. Back in step 908, if one or more non-key Fields are not equal to those in Rn, then in step 912, Rx is marked as a potential conflict for Rn. This process is repeated from step 904 to step 912 until all records Rx in CL1 are processed.

When all records Rx are processed, the general steps illustrated in FIG. 10b are performed. In steps 914 and 916, for each potential conflict Ry, each record Rm in CL0 is processed. In step 918, if Rm is not marked DONE and if all fields in Ry and Rm are equal, then Rm is no longer marked as a potential conflict. Back in step 916, if there are no more records Rm in CL0, then in step 920, if Ry is still a potential conflict, then in step 922 CONFLICT for Ry is returned. If all potential conflicts Ry are processed or if there are no potential conflicts Ry, then in step 924, NOT_FOUND is returned to indicate that there are no conflicts.

If operations illustrated in FIGS. 10a and 10b return a result of CONFLICT or DUPLICATE, and in step 928, if Rn is marked as CREATE, then it is determined in step 932 (of FIG. 9b) whether Rx is marked as either CREATE or as UPDATE. If Rx is marked as either CREATE or UPDATE, and in step 934 if Rx and Rn are not duplicates, then in step 936, Rx is added to D0' (using the steps illustrated in FIG. 11a) and Rn is added to D1' (using the steps illustrated in FIG. 11a). Back in step 934, if Rx and Rn are duplicates, then in step 938 no action is taken. Back in step 932, if Rx is not marked as CREATE or UPDATE, and in step 940 if Rx is instead marked as DELETE, then in step 942, Rn is added to D1' (using the steps illustrated in FIG. 11a). In step 944, Rn is marked as DONE, and the next record Rn in CL0 is processed.

Figure 9C:
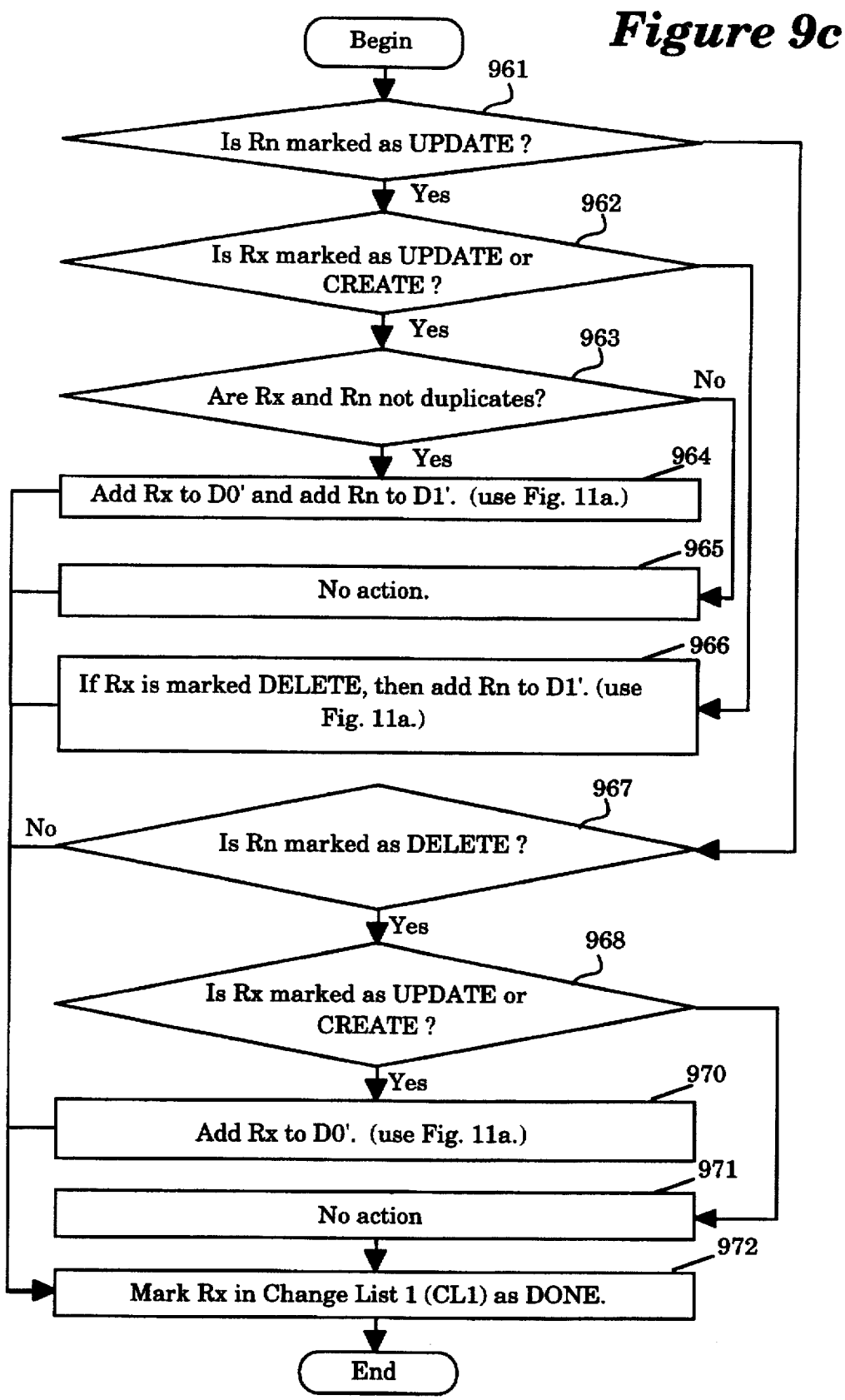
Figure 9D:
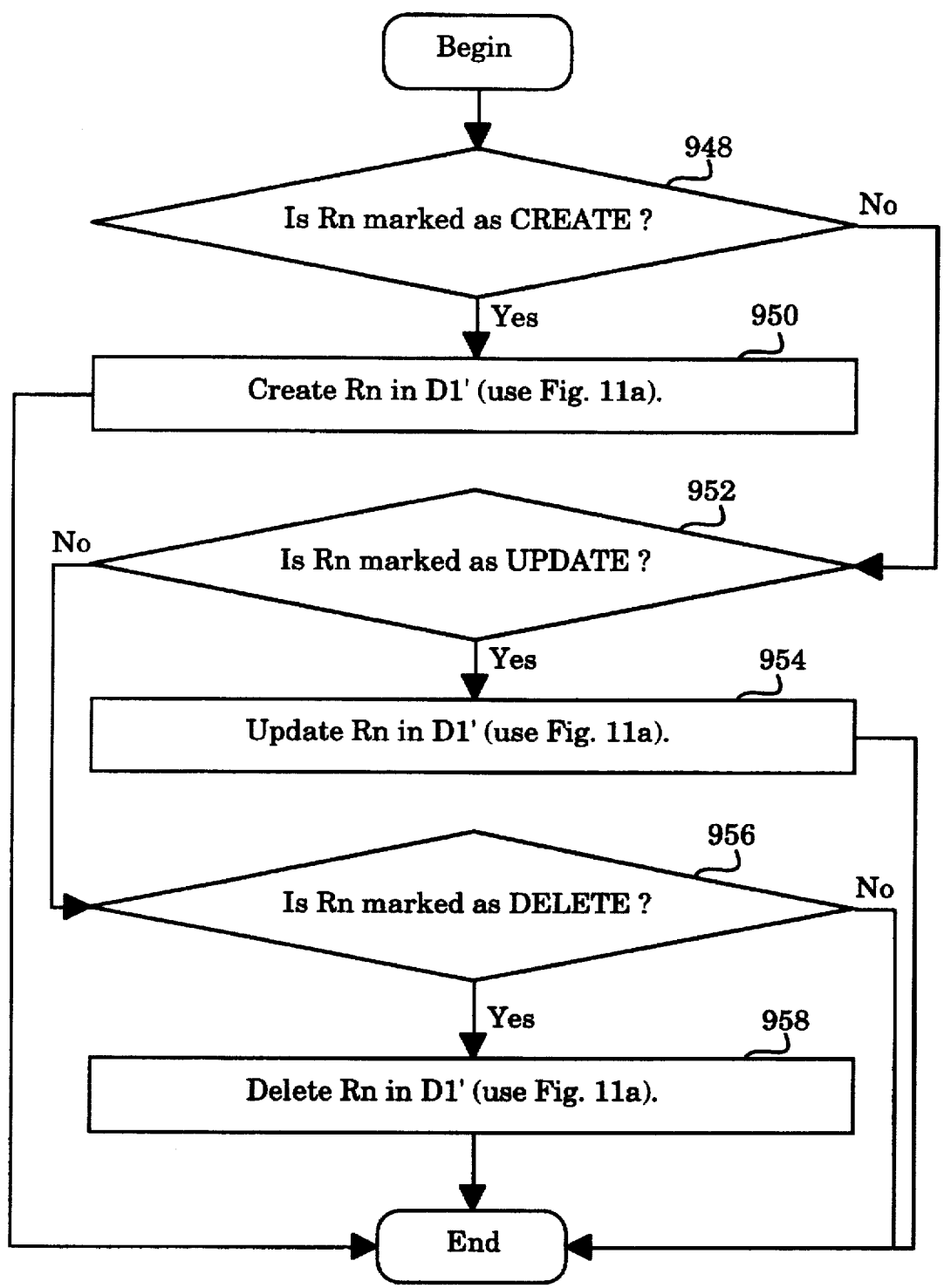

Back in step 926, if the result from the operations illustrated in FIGS. 10a and 10b is neither CONFLICT or DUPLICATE, then the general steps illustrated in FIG. 9d are performed. In step 948, if Rn is marked CREATE, then in step 950, Rn is created in D1' (using the steps illustrated in FIG. 11a). Otherwise, in step 952, if Rn is marked UPDATE, then in step 954 Rn is updated in D1' (using the steps illustrated in FIG. 11a). If Rn is not marked UPDATE or CREATE, and in step 956 if Rn is marked DELETE, then in step 958 Rn is deleted in D1' (using the steps illustrated in FIG. 11a). In step 944, Rn is marked as DONE and the next record Rn in CL0 is processed. Back in step 928, if Rn is not marked as CREATE, then the general steps illustrated in FIG. 9c are followed.

In FIG. 9c, in step 961, if Rn is marked UPDATE, then in step 962, it is determined if Rx is marked UPDATE or CREATE. If Rx is marked UPDATE or CREATE, then in step 963 if Rx and Rn are not duplicates, then in step 964 Rx is added to D0' (using the steps illustrated in FIG. 11a) and Rn is added to D1' (using the steps illustrated in FIG. 11a). In step 972, Rx in CL1 is marked as DONE.

Back in step 963, if Rx and Rn are duplicates, then in step 965, no action is taken. In step 972, Rx in CL1 is marked as DONE. Back in step 962, if Rx is neither marked as UPDATE nor as CREATE, and in step 966, if Rx is marked DELETE, then Rn is added to D1' (using the steps illustrated in FIG. 11a). In step 972, Rx in CL1 is marked as DONE.

Back in step 961, if Rn is not marked as UPDATE, then in step 967, it is determined if Rn is marked as DELETE. If Rn is not marked as DELETE, then in step 972, Rx in CL1 is marked as DONE. If Rn is marked as DELETE, and in step 968, if Rx is marked UPDATE or CREATE then in step 970, Rx is added to D0'. If Rx is not marked as UPDATE or CREATE, then in step 971, no action is taken. In step 972, Rx in CL1 is marked as DONE. When the process in FIG. 9c is completed, Rn in CL0 is marked as DONE back in step 944 of FIG. 9a. Back in step 900 of FIG. 9a, if there are no more records Rn in CL0, then the general steps illustrated in FIG. 9e are followed.

Figure 9E:
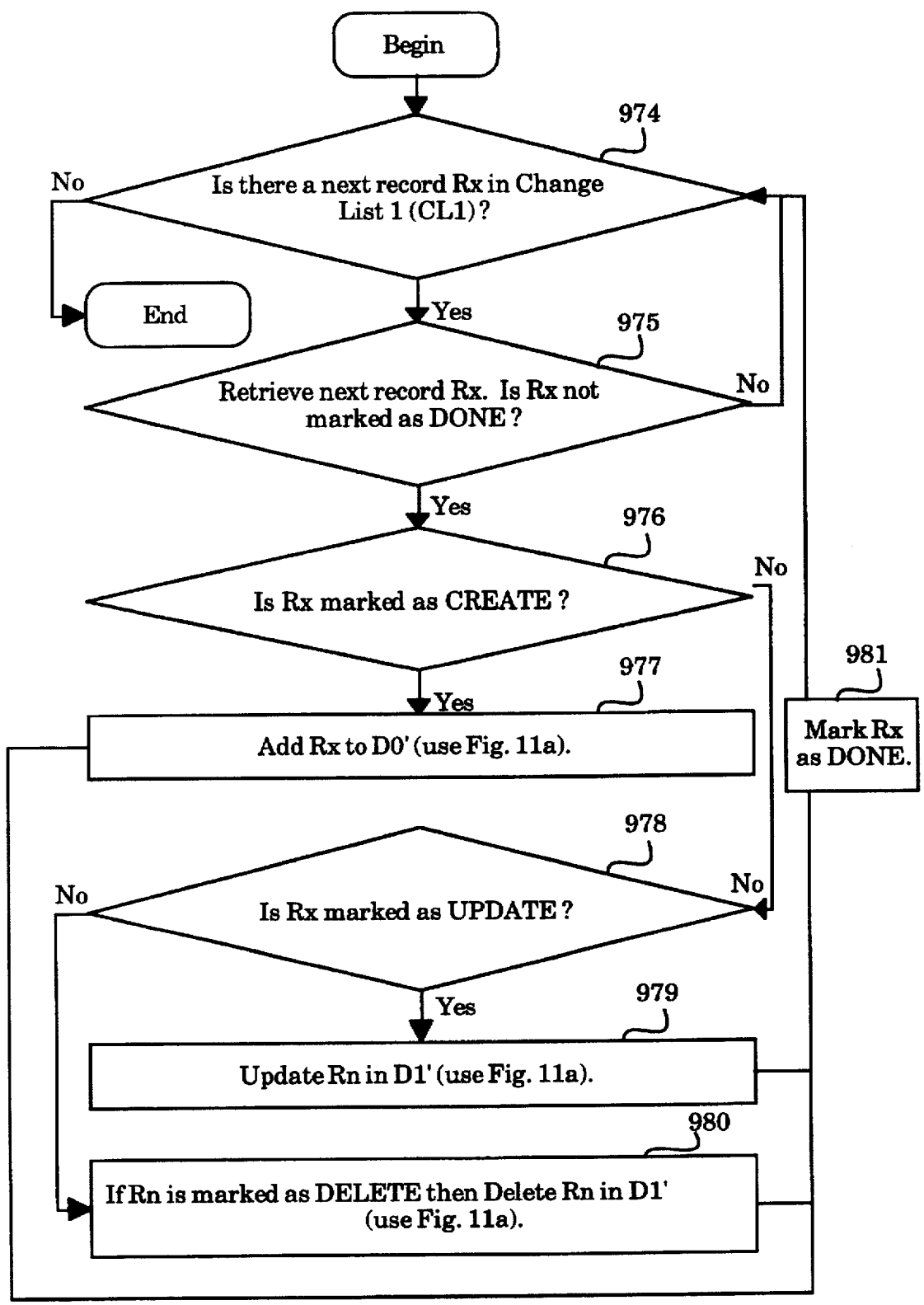

In FIG. 9e, for each record Rx in CL1, if Rx is not marked as DONE in step 975, then in step 976 it is determined if Rx is marked as CREATE. If Rx is marked as CREATE, then in step 977, Rx is added to D0' (using the steps illustrated in FIG. 11a). In step 981, Rx is marked as DONE. Back in step 976, if Rx is not marked as CREATE, then in step 978 it is determined if Rx is marked as UPDATE. If Rx is marked as UPDATE, then in step 979 Rx is updated in D0' (using the steps illustrated in FIG. 11a). In step 981, Rx is marked as DONE. Back in step 978, if Rx is not marked as UPDATE, and if Rx is marked as DELETE in step 980, then Rx is deleted in D0' (using the steps illustrated in FIG. 11a). In step 981, Rx is marked as DONE. The steps from step 974 to step 980 are repeated until all records Rx in CL1 are processed. At this point, the records in D0' and D1' are equivalent, i.e. synchronized.

With the availability of a complete history of the changed data as produced above, it is possible to make automatic decisions for conflict resolution. In addition, there is little danger of incorrectly overwriting or deleting data. This allows synchronization to run unobtrusively in the background without having to ask a user to confirm before overwriting or deleting data.

Figure 11A:
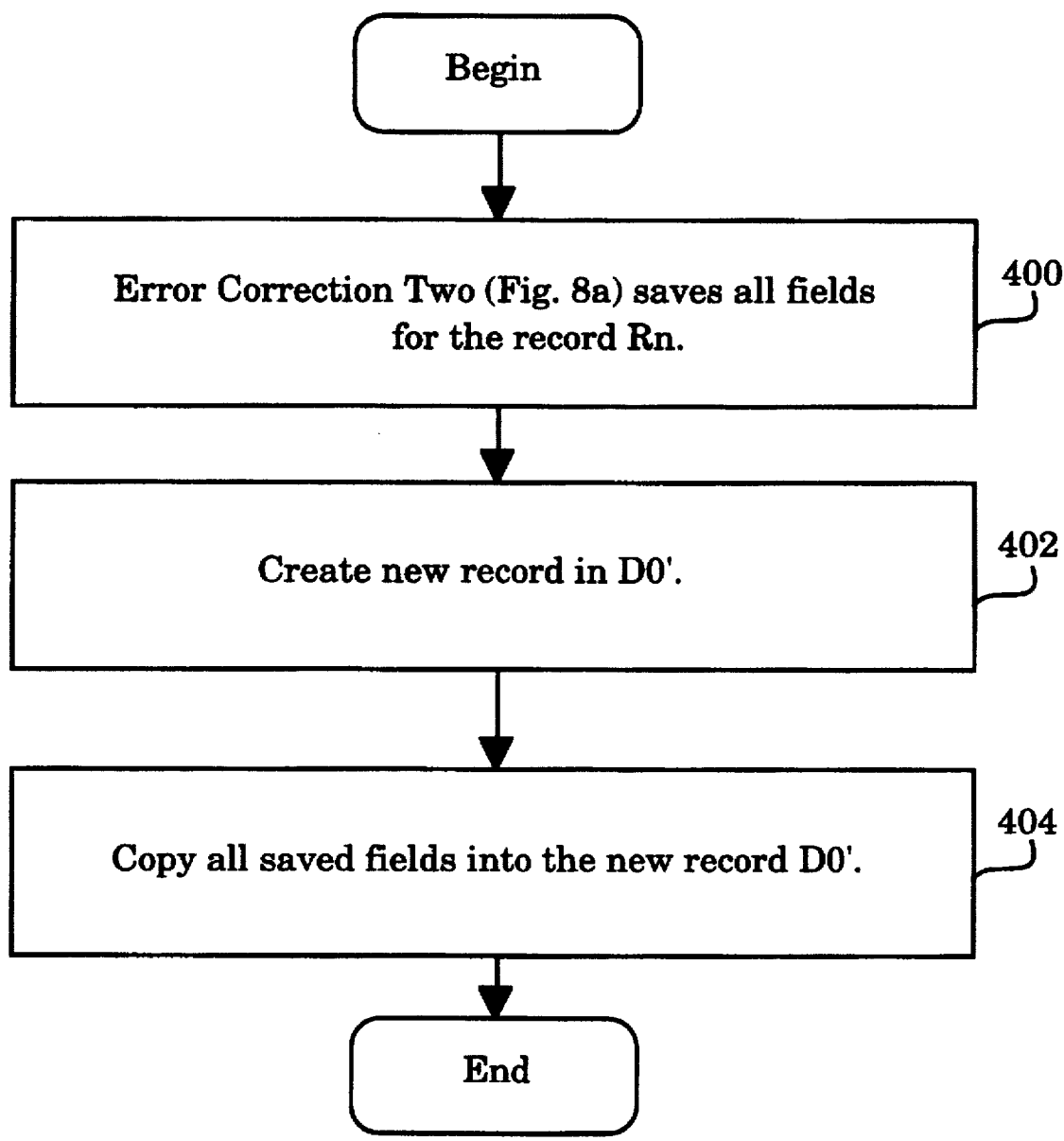
FIGS. 11a–11c are flow charts describing the general steps followed by the Change Existing Data mechanism referred to in FIG. 3.
Figure 11B:
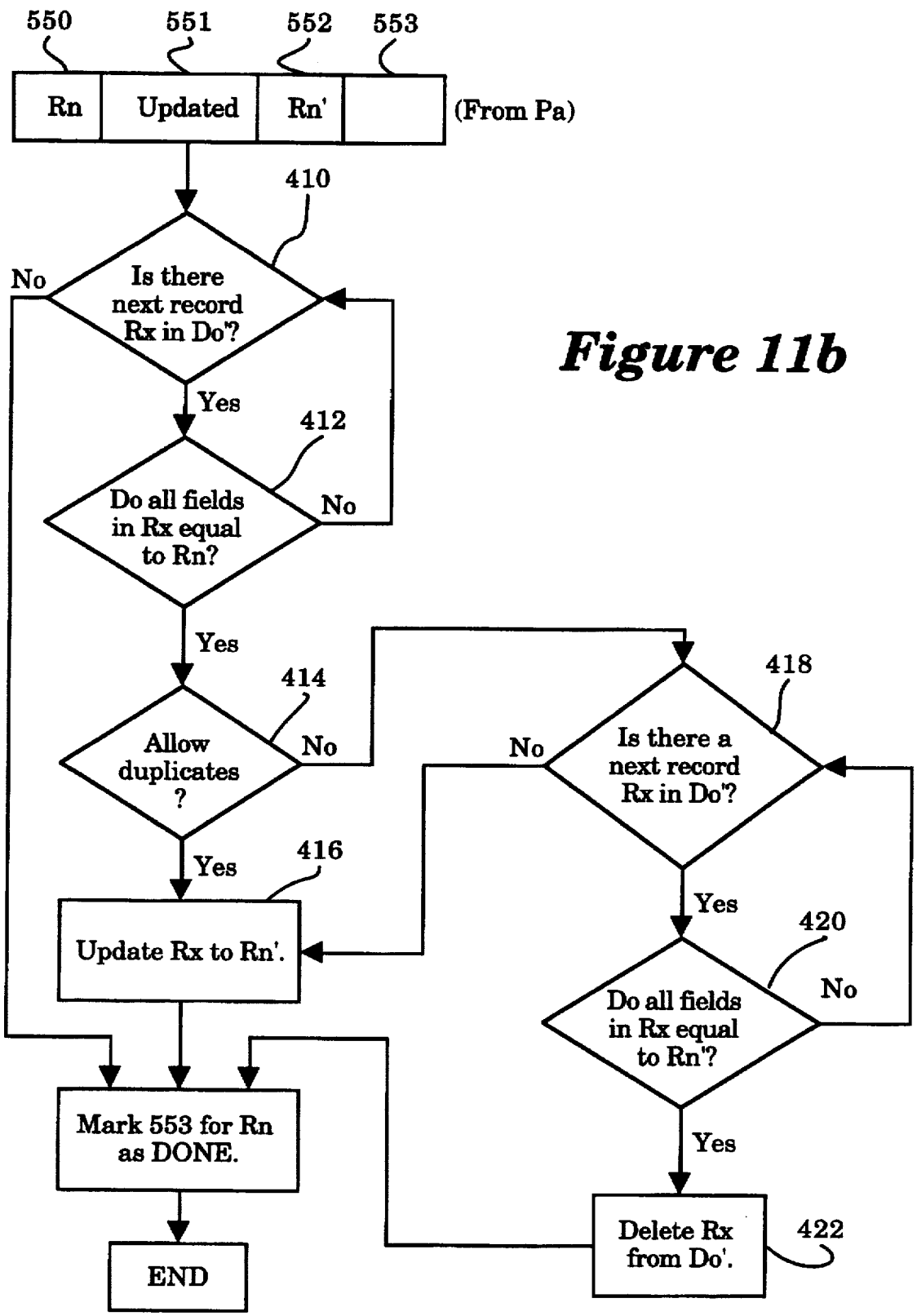
Figure 11C:
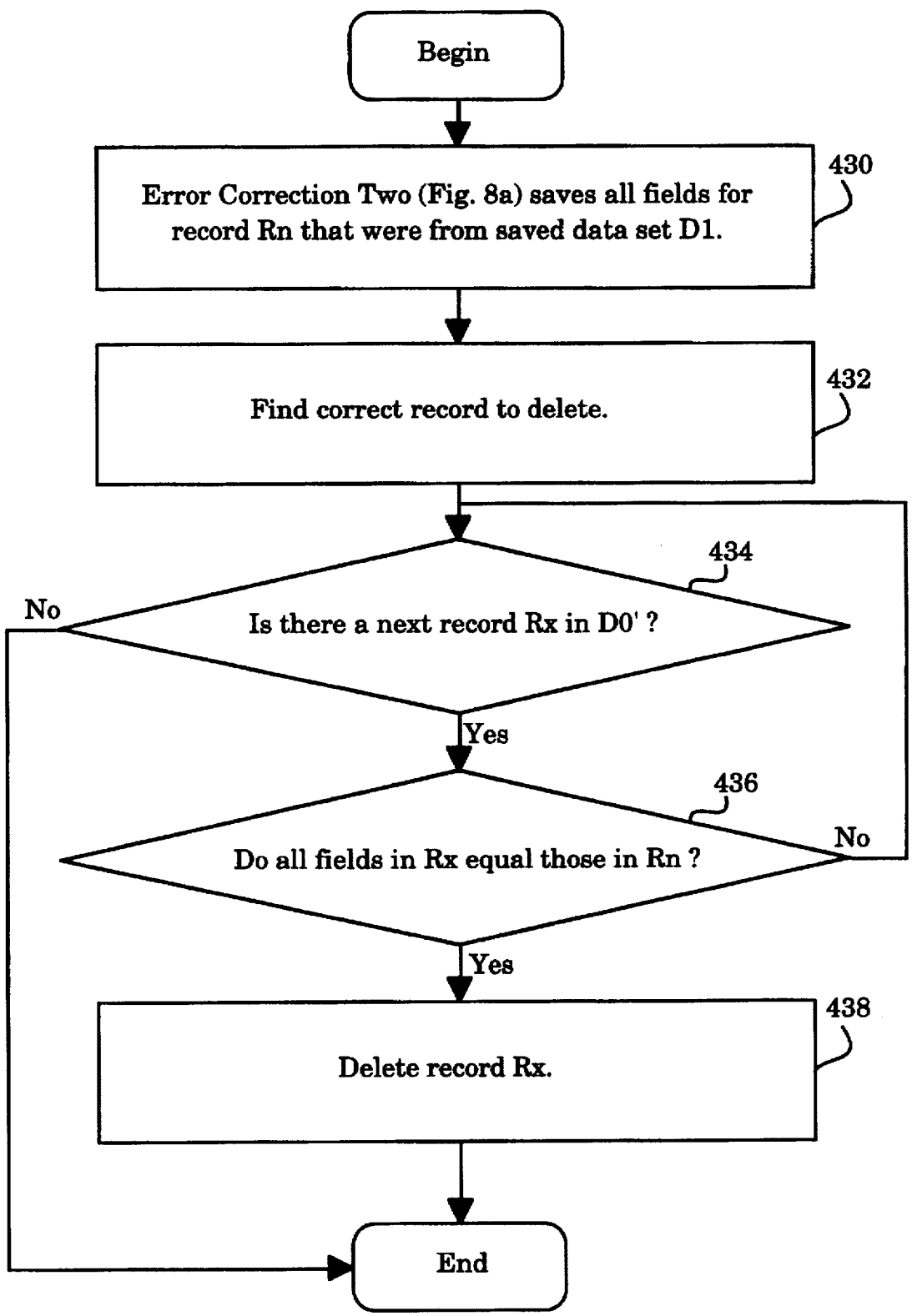

FIGS. 11a through 11c are flow diagrams describing the general steps followed by the Change Existing Data mechanism referred to in FIG. 3. Although the details for importing and exporting data is application specific and well understood, making the required changes to the data sets without unique record identifiers is non-trivial. Such case is resolved by Change Existing Data mechanism 308.

Change Existing Data mechanism 308 can change an existing data set such as D0' in three ways: Create a record, Update a record, and Delete a record. A method for each is described in detail in FIGS. 11a, 11b and 11c with instructions on specific information regarding each record which must be retained by Error Correction mechanism two.

FIG. 11a illustrates the general steps by which a record Rn is Created in D0'. In step 400, Error Correction mechanism two saves all fields for record Rn. In step 402, a new record is then created in D0'. In step 404, all saved fields are copied into the newly created record in D0'.

FIG. 11b illustrates the general steps by which a record Rn is updated in D0'. Error Correction Mechanism two saves all original fields for record Rn, as well as all fields in Rn', the new values for Rn. This is described in FIGS. 8d and 8e, and the resulting Change Log entry is shown in FIG. 11b. First the correct record to update is searched by comparing original record Rn with all records in D0', until a record Rx is found for which all of Rx's fields are equal to those in Rn in steps 410, 412 and 414. Then the fields of Rx are updated with the fields in Rn' in step 416. If duplicate records (where all fields are the same) are not allowed or desired in D0', an extra step is needed before updating Rx. In addition to searching for Rx above, all records in D0' are also searched in steps 418 and 420 to find a duplicate for Rn'. If a duplicate exists, then there is no need to update Rx to Rn', since this will result in two records with exactly the same fields. The correct action here is to delete Rx from D0' in step 422. Finally, in step 424, Rn is marked DONE (in 553).

The steps in FIG. 11b guard against errors caused by records having the same values in their Key Fields. An implementation using SUID mechanism 304 to find a record Rx to update may update the wrong record if more than one record share the same value in their Key Fields.

FIG. 11c illustrates the general steps by which a record Rn is Deleted in D0'. In step 430, Error Correction mechanism two saves all fields for record Rn that were from the saved data set D1. In step 432, the correct record to delete is searched. In step 434, for each record Rx in D0', it is determined in step 436 if all fields in Rx equal the fields in Rn. If all fields in Rx are equal to those in Rn then in step 438, record Rx is deleted. Otherwise, the next record Rx in D0' is retrieved for similar processing back in step 434.

It is important to match all fields in step 436 before deleting. If only the Key Fields are examined, it is possible to delete the wrong record if more than one record has the same value in their Key Fields. In addition, it is pertinent for Error Correction mechanism two to save the field values for record Rn from the saved data set D1. This is due to the fact that some fields in Rn may have changed in D1' before the entire record is deleted. A request to Delete a record in D0' can only come from running Error Correction mechanism two on D1' and D1. In addition, the Delete operation illustrated in FIG. 11c would only be used if the equivalent record Rx in D0' has not been changed, and thus guarantees that the Delete operation would find the correct record to delete.

FIG. 12 is a table 440 illustrating the Synchronization mechanism 306 of the present invention. Column 442 of table 440 indicates case numbers. Column 444 indicates the changes in data set D0. Column 446 indicates the changes in data set D1. Column 448 indicates the result of the changes in data set D0. Column 450 indicates the result of the changes in data set D1. R1+ indicates that R1 has been added (i.e. created) to the data set. R1- indicates that R1 has been deleted from the data set. R1->R1' indicates that R1 has been changed (i.e. updated) to R1'.

Change Detection mechanism 302 produces the cases as described in column 444 for changes to data set D0 and column 446 for changes to data set D1. Columns 448 and 450 describe what Synchronization mechanism 306 must perform given CL0 and CL1. More specifically, column 448 describes the action resulting in the changes to data set D0 and column 450 describes the action resulting in the changes to data set D1. If the additional inputs to Synchronization mechanism 306 are D0 and D1, then all actions described in columns 448 and 450 must be performed. If the additional inputs are D0' and D1', then only those actions which are circled must be performed. It is assumed for the sake of illustration that all records R1, R2, R3, etc., have unique Key Field values.

FIG. 13 is a table 460 illustrating cases which may occur if there are records with the same Key Field values. These records are referred to as RR1, RR2, RR3, etc., and RR1', RR2', RR3' etc., and have the same Key Field values (e.g. same name in a phone book of records). The columns 462 through 470 indicate the same entries as those described for the table in FIG. 12.

What has been described is a method and an apparatus for performing record level synchronization on two or more applications. Record level synchronization overcomes the limitations of the prior art technique by synchronizing the individual data items (records) in a file. It uses knowledge of how individual data items are stored in a file. Record level synchronization of the present invention leads to a more efficient and accurate synchronization as compared to the prior art synchronization technique, without requiring individual applications to implement a standard means for supporting synchronization.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

What is claimed is:

1. An apparatus for application independent synchronization of a first set of data with a second set of data from the same or different applications, said apparatus comprising:

a memory which contains, a change detection mechanism retroactively generating a change list for said first and second sets of data having a plurality of records, said change list generated without requiring any of the applications to have a synchronization function or their own synchronization primitives, said change list listing the changes made at a record level to said first and second sets of data for record level synchronization of said first and second sets of data, and a synchronization mechanism coupled to said change detection mechanism, said synchronization mechanism making said first set of data and said second set of data equivalent by using the information in said change list generated by said change detection mechanism, said synchronization mechanism producing the same synchronization results regardless of whether one or both of said first and second sets of data are modified prior to synchronization; and a processor coupled to said memory, said processor running said change detection mechanism and said synchronization mechanism.

2. The apparatus of claim 1 wherein said change detection mechanism further comprises:

a semi-unique identification mechanism for identifying whether a record in a given data set is a duplicate of a corresponding record in a modified data set by using the contents of individual fields in a record; and an error correction mechanism for identifying said duplicate which was not identified by said Semi-Unique Identification mechanism.

3. The apparatus of claim 1 further comprising a change existing data mechanism for correctly identifying a record to update or delete without requiring said record in said first and second set of data to contain system assigned unique identifiers.

4. The system of claim 1 wherein said means for generating further comprises:

means for identifying whether a record in a given data set is a duplicate of a corresponding record in a modified data set by using the contents of individual fields in a record; and means for identifying said duplicate which was not identified by said Semi-Unique Identification mechanism.

5. The system of claim 1 wherein said means for synchronizing further comprises means for correctly identifying a record to update or delete without requiring said record in said first and second set of data to contain system assigned unique identifiers.

6. An apparatus for application independent synchronization of a first set of data with a second set of data at a record level from the same or different applications, said apparatus comprising:

means for containing, means for retroactively generating a change list for said first and second sets of data having a plurality of records, said change list generated without requiring any of the applications to have a synchronization function or their own synchronization primitives, said change list listing the changes made at a record level to said first and second sets of data for record level synchronization of said first and second sets of data, and means for making said first set of data and said second set of data equivalent by using the information in said change list generated by said means for retroactively generating, said means for making coupled to said means for retroactively generating, said means for making producing the same synchronization results regardless of whether one or both of said first and second sets of data are modified prior to synchronization; and means for running said means for retroactively generating and said means for making.

7. The apparatus of claim 6 wherein said means for generating further comprises:

means for identifying whether a record in a given data set is a duplicate of a corresponding record in a modified data set by using the contents of individual fields in a record; and means for identifying said duplicate which was not identified by said Semi-Unique Identification mechanism.

8. The apparatus of claim 6 further comprising means for correctly identifying a record to update or delete without requiring said record in said first and second set of data to contain system assigned unique identifiers.

9. A computer system for application independent synchronization of a first set of data with a second set of data at a record level from the same or different applications, said system comprising:

a memory which contains, a change detection mechanism retroactively generating a change list for said first and second sets of data having a plurality of records, said change list generated without requiring any of the applications to have a synchronization function or their own synchronization primitives, said change list listing the changes made at a record level to said first and second sets of data for record level synchronization of said first and second sets of data, and a synchronization mechanism coupled to said change detection mechanism, said synchronization mechanism making said first set of data and said second set of data equivalent by using the information in said change list generated by said change detection mechanism, said synchronization mechanism producing the same synchronization results regardless of whether one or both of said first and second sets of data are modified prior to synchronization; and a processor coupled to said memory, said processor running said change detection mechanism and said synchronization mechanism.

10. The system of claim 9 wherein said change detection mechanism further comprises:

an Semi-Unique Identification mechanism for identifying whether a record in a given data set is a duplicate of a corresponding record in a modified data set by using the contents of individual fields in a record; and an error correction mechanism for identifying said duplicate which was not identified by said Semi-Unique Identification mechanism.

11. The system of claim 9 wherein said synchronization mechanism further comprises a change existing data mechanism for correctly identifying a record to update or delete without requiring said record in said first and second set of data to contain system assigned unique identifiers.

12. A computer system for application independent synchronization of a first set of data with a second set of data at a record level from the same or different applications, said system comprising:

means for containing, means for retroactively generating a change list for said first and second sets of data having a plurality of records, said change list generated without requiring any of the applications to have a synchronization function or their own synchronization primitives, said change list listing the changes made at a record level to said first and second sets of data for record level synchronization of said first and second sets of data, and means for making said first set of data and said second set of data equivalent by using the information in said change list generated by said means for retroactively generating, said means for making coupled to said means for retroactively generating, said means for making producing the same synchronization results regardless of whether one or both of said first and second sets of data are modified prior to synchronization; and means for running said means for retroactively generating and said means for making.

13. A method for application independent synchronization of a first set of data with a second set of data from the same or different applications, said method comprising the steps of:

retroactively generating a first change list listing changes made to said first set of data at a record level and a second change list listing changes made to said second set of data at a record level for record level synchronization of said first and second sets of data, said first and second sets of data having a plurality of records, said first and second change lists generated without requiring any of the applications to have a synchronization function or their own synchronization primitives, and synchronizing said first set of data with said second set of data using said first change list generated for said first set of data and said second change list generated for said second set of data, said step of synchronizing producing the same synchronization results regardless of whether one or both of said first and second sets of data are modified prior to synchronization.

14. The method of claim 13 wherein said step of generating further comprising the steps of:

identifying whether a record in a given data set is a duplicate of another record in a modified data set, said first set of data and said second set of data being said given data set and said first set of data and said second set of data with changes being said modified data set; and identifying said duplicate which was not identified is said step of identifying a record.

15. The method of claim 13 wherein said step of synchronizing further comprising the step of changing records in said first set of data and records in said second set of data for synchronizing records in said first set of data and said second set of data.

* * * * *